United States Patent
Conley et al.

(10) Patent No.: US 9,671,065 B2
(45) Date of Patent: Jun. 6, 2017

(54) PUMP HAVING WEAR AND WEAR RATE DETECTION

(71) Applicant: Lincoln Industrial Corporation, St. Louis, MO (US)

(72) Inventors: Paul G. Conley, St. Charles, MO (US); Nathan D. Donovan, Columbia, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 642 days.

(21) Appl. No.: 14/056,394

(22) Filed: Oct. 17, 2013

(65) Prior Publication Data

US 2015/0107329 A1    Apr. 23, 2015

(51) Int. Cl.
| | | |
|---|---|---|
| F16N 29/00 | (2006.01) | |
| F04B 43/00 | (2006.01) | |
| F16N 1/00 | (2006.01) | |
| F16J 1/00 | (2006.01) | |
| F16J 13/02 | (2006.01) | |
| F16N 13/02 | (2006.01) | |

(52) U.S. Cl.
CPC .......... *F16N 29/00* (2013.01); *F04B 43/0081* (2013.01); *F16J 1/00* (2013.01); *F16N 1/00* (2013.01); *F16N 13/02* (2013.01); *F16N 2250/04* (2013.01)

(58) Field of Classification Search
CPC . F16N 7/385; F16N 1/00; F16N 13/02; F16N 29/00; F16N 2250/04; F04B 43/0081; F16J 1/00; G01B 7/12; G01B 7/14; G01M 3/2869; G01N 3/56
USPC ................. 702/34; 73/7–10, 37; 92/172–260
See application file for complete search history.

(56) References Cited

U.S. PATENT DOCUMENTS

| | | | |
|---|---|---|---|
| 910,802 | A | 1/1909 | Enos et al. |
| 1,384,353 | A | 7/1921 | Shavers |
| 1,673,134 | A | 6/1928 | Barks |
| 1,773,660 | A | 8/1930 | Barks |
| 1,789,195 | A | 1/1931 | Sagle |
| 1,801,414 | A | 4/1931 | Davis |
| 1,950,158 | A | 3/1934 | Barks |
| 1,968,017 | A | 7/1934 | Davis |
| 2,016,405 | A | 10/1935 | Watson |

(Continued)

FOREIGN PATENT DOCUMENTS

| | | |
|---|---|---|
| CN | 101666222 A | 3/2010 |
| DE | 19623537 A1 | 12/1997 |

(Continued)

OTHER PUBLICATIONS

International Search Report for corresponding application serial No. PCT/US14/59217 mailed Mar. 11, 2015.

(Continued)

*Primary Examiner* — Laura Martin
*Assistant Examiner* — Irving A Campbell
(74) *Attorney, Agent, or Firm* — Senniger Powers LLP

(57) ABSTRACT

Apparatus and method for supplying lubricant to a plurality of lubrication sites. The apparatus includes a controller that diagnoses piston wear by driving the pump to achieve a predetermined pressure, stopping the pump with the piston in a home position, and measuring pressure at a preselected time interval after the step of stopping the pump. The amount of piston wear is approximated based on a difference between the predetermined pressure and the measured pressure at the predetermined time interval.

16 Claims, 18 Drawing Sheets

(56) References Cited

U.S. PATENT DOCUMENTS

| | | |
|---|---|---|
| 2,521,177 A | 9/1950 | LeClair |
| 2,566,702 A | 9/1951 | Harrigan |
| 2,569,110 A | 9/1951 | McGillis et al. |
| 2,577,658 A | 12/1951 | Kenoszt |
| 2,627,320 A | 2/1953 | Rotter |
| 2,939,011 A | 7/1954 | Bisso et al. |
| 2,766,848 A | 10/1956 | Bystricky et al. |
| 2,855,069 A | 10/1958 | Graves |
| 2,867,481 A | 1/1959 | Hornbostel |
| 2,960,185 A | 11/1960 | Klein |
| 3,025,559 A | 3/1962 | Basinger |
| 3,113,282 A | 12/1963 | Coleman |
| 3,145,803 A | 8/1964 | Cobert |
| 3,317,002 A | 5/1967 | McKenzie |
| 3,409,165 A | 11/1968 | Creith |
| 3,437,771 A | 4/1969 | Nusbaum |
| 3,481,431 A | 12/1969 | Dorsey |
| 3,507,359 A | 4/1970 | Warnock |
| 3,515,245 A | 6/1970 | Obergefell et al. |
| 3,563,672 A | 2/1971 | Bergstrom |
| 3,586,129 A | 6/1971 | Cass |
| 3,659,176 A | 4/1972 | Marshall |
| 3,659,675 A | 5/1972 | Edelstein et al. |
| 3,674,112 A | 7/1972 | Roberts |
| 3,722,967 A | 3/1973 | Lewis |
| 3,785,456 A | 1/1974 | McIntire et al. |
| 3,887,110 A | 6/1975 | Porter |
| 3,891,057 A | 6/1975 | Stevens |
| 3,934,600 A | 1/1976 | Murphy |
| 3,951,480 A | 4/1976 | Nicholson |
| 3,958,725 A | 5/1976 | Reeve |
| 3,972,387 A | 8/1976 | Braun |
| 4,009,971 A | 3/1977 | Krohn et al. |
| 4,053,901 A | 10/1977 | Skafvenstedt et al. |
| 4,069,835 A | 1/1978 | Stadler |
| 4,125,176 A | 11/1978 | Thrasher, Jr. |
| 4,143,995 A | 3/1979 | Divisi |
| 4,170,551 A | 10/1979 | Honour |
| 4,192,361 A | 3/1980 | Moser |
| 4,243,151 A | 1/1981 | Bruening |
| 4,314,653 A | 2/1982 | Sindoni |
| 4,326,603 A | 4/1982 | Darrow et al. |
| 4,425,986 A | 1/1984 | Wedlin |
| 4,490,665 A | 12/1984 | Meyer et al. |
| 4,566,868 A | 1/1986 | Menzies |
| 4,643,649 A | 2/1987 | Schmid |
| 4,686,439 A | 8/1987 | Cunningham et al. |
| 4,718,824 A | 1/1988 | Cholet et al. |
| 4,758,131 A | 7/1988 | Gurney |
| 4,759,427 A | 7/1988 | Onose |
| 4,797,834 A | 1/1989 | Honganen et al. |
| 4,802,554 A | 2/1989 | Takayama et al. |
| 4,830,219 A | 5/1989 | Siemann |
| 4,848,657 A | 7/1989 | Hashimoto et al. |
| 4,867,665 A | 9/1989 | Wada |
| 4,890,696 A | 1/1990 | Skarupa |
| 4,919,595 A | 4/1990 | Likuski et al. |
| 4,922,852 A | 5/1990 | Price |
| 4,944,658 A | 7/1990 | Buttner |
| 4,955,792 A | 9/1990 | Skarupa |
| 4,969,756 A | 11/1990 | Villec et al. |
| 5,022,556 A | 6/1991 | Dency et al. |
| 5,025,827 A | 6/1991 | Weng |
| 5,038,892 A | 8/1991 | Maloney |
| 5,038,893 A | 8/1991 | Willner et al. |
| 5,126,722 A | 6/1992 | Kamis |
| 5,165,502 A | 11/1992 | Hirose et al. |
| 5,178,405 A | 1/1993 | Brandstadter |
| 5,182,720 A | 1/1993 | Beck et al. |
| 5,188,197 A | 2/1993 | Meuer et al. |
| 5,216,348 A | 6/1993 | Ito |
| 5,216,822 A | 6/1993 | Madiedo |
| 5,219,040 A | 6/1993 | Meuer et al. |
| 5,221,885 A | 6/1993 | Molieri et al. |
| 5,222,576 A | 6/1993 | Meuer et al. |
| 5,258,930 A | 11/1993 | Fukuyoshi et al. |
| 5,259,481 A | 11/1993 | Meuer et al. |
| 5,285,871 A | 2/1994 | Stevenpiper |
| 5,293,959 A | 3/1994 | Kimberlin |
| 5,295,737 A | 3/1994 | Epple et al. |
| 5,307,288 A | 4/1994 | Haines |
| 5,313,548 A | 5/1994 | Arvidson et al. |
| 5,356,577 A | 10/1994 | Boldis et al. |
| 5,497,852 A | 3/1996 | Little et al. |
| 5,574,351 A | 11/1996 | Jacobson et al. |
| 5,597,051 A | 1/1997 | Moriya et al. |
| 5,626,467 A | 5/1997 | Cantley |
| 5,634,531 A | 6/1997 | Graf et al. |
| 5,685,331 A | 11/1997 | Westermeyer |
| 5,725,358 A | 3/1998 | Bert et al. |
| 5,730,250 A | 3/1998 | Tsai |
| 5,838,132 A | 11/1998 | Tanaka |
| 5,850,849 A | 12/1998 | Wood |
| 5,869,108 A | 2/1999 | Hiraoka |
| 5,878,842 A | 3/1999 | Rake |
| 5,921,437 A | 7/1999 | Takachi |
| 5,961,299 A | 10/1999 | Gruett et al. |
| 6,012,551 A | 1/2000 | Raab |
| 6,045,331 A | 4/2000 | Gehm et al. |
| 6,053,285 A | 4/2000 | Reeves |
| 6,109,878 A | 8/2000 | Barton et al. |
| 6,161,723 A | 12/2000 | Cline et al. |
| 6,216,822 B1 | 4/2001 | May et al. |
| 6,305,404 B1 | 10/2001 | Steiger |
| 6,322,336 B1 | 11/2001 | Huss |
| 6,398,513 B1 | 6/2002 | Amsler et al. |
| 6,474,950 B1 | 11/2002 | Waldo |
| 6,567,710 B1 | 5/2003 | Boelkins |
| 6,601,738 B2 | 8/2003 | Weigand et al. |
| 6,604,909 B2 | 8/2003 | Schoenmeyr |
| 6,607,360 B2 | 8/2003 | Fong |
| 6,636,782 B2 | 10/2003 | Morikwawa et al. |
| 6,659,728 B2 | 12/2003 | Bush et al. |
| 6,793,042 B2 | 9/2004 | Brouillet |
| 6,811,387 B1 | 11/2004 | Tsutsumi et al. |
| 6,832,620 B2 | 12/2004 | Jaeger |
| 6,886,589 B2 | 5/2005 | Oretti |
| 6,949,907 B2 | 9/2005 | DeJohn |
| 6,966,967 B1 | 11/2005 | Curry et al. |
| 6,979,181 B1 | 12/2005 | Kidd |
| 7,017,712 B1 | 3/2006 | Rake et al. |
| 7,059,450 B2 | 6/2006 | O'Toole et al. |
| 7,198,065 B2 | 4/2007 | Vester |
| 7,327,116 B2 | 2/2008 | Kuo |
| 7,338,260 B2 | 3/2008 | Brundle et al. |
| 7,345,447 B2 | 3/2008 | Doutney et al. |
| 7,349,814 B2 | 3/2008 | Venkatachari et al. |
| 7,539,560 B2 | 5/2009 | Boger et al. |
| 7,588,422 B2 | 9/2009 | Ochi et al. |
| 7,635,253 B2 | 12/2009 | Garcia-Ortiz |
| 7,740,457 B2 | 6/2010 | Lehmann |
| 7,824,164 B2 | 11/2010 | Hakoda et al. |
| 7,980,118 B2 | 7/2011 | He et al. |
| 2002/0144865 A1 | 10/2002 | Clancy et al. |
| 2002/0157901 A1 | 10/2002 | Kast et al. |
| 2003/0039561 A1 | 2/2003 | Batten et al. |
| 2003/0184018 A1 | 10/2003 | Upton et al. |
| 2004/0031463 A1 | 2/2004 | Williams et al. |
| 2004/0129499 A1 | 7/2004 | Okpokowuruk |
| 2005/0180870 A1 | 8/2005 | Stanley et al. |
| 2007/0137936 A1 | 6/2007 | Akechi et al. |
| 2007/0177835 A1 | 8/2007 | Verhaegen |
| 2007/0289994 A1 | 12/2007 | Kotyk |
| 2008/0185226 A1 | 8/2008 | Saam |
| 2008/0202854 A1 | 8/2008 | Paluncic et al. |
| 2008/0240944 A1 | 10/2008 | Arens |
| 2009/0159576 A1 | 6/2009 | Sommerfeld et al. |
| 2010/0043409 A1 | 2/2010 | Naydenov et al. |
| 2010/0272584 A1 | 10/2010 | Kreutzkamper et al. |
| 2011/0174577 A1 | 7/2011 | Kreutzkamper et al. |
| 2012/0132305 A1 | 5/2012 | Conley |
| 2012/0132483 A1 | 5/2012 | Conley et al. |
| 2012/0134847 A1 | 5/2012 | Conley et al. |

(56) References Cited

U.S. PATENT DOCUMENTS

| | | |
|---|---|---|
| 2013/0092284 A1 | 4/2013 | Holland et al. |
| 2013/0168187 A1 | 7/2013 | Conley et al. |
| 2013/0168188 A1 | 7/2013 | Donovan et al. |

FOREIGN PATENT DOCUMENTS

| | | |
|---|---|---|
| DE | 202006000277 U1 | 3/2006 |
| EP | 2128443 B1 | 10/2010 |
| GB | 1546909 A | 5/1979 |
| JP | 0280815 A | 3/1990 |
| JP | 02195020 A | 8/1990 |
| JP | 06147397 A | 5/1994 |
| JP | 08004988 A | 1/1996 |
| JP | 2002323196 A | 11/2002 |
| JP | 2005067819 A | 3/2005 |
| JP | 2005195166 A | 7/2005 |
| JP | 2007003471 A | 1/2007 |
| TW | 201000789 A | 1/2010 |

OTHER PUBLICATIONS

Written Opinion for corresponding application serial No. PCT/US14/59217 mailed Mar. 11, 2015.

PUMP HAVING WEAR AND WEAR RATE DETECTION

FIELD OF THE INVENTION

The present invention generally relates to apparatus for supplying lubricant, and more particularly to a method of detecting pump wear, estimating an amount of wear, and estimating wear rate.

BACKGROUND OF THE INVENTION

This invention has particular application to automatic lubrication systems for supplying lubricant to multiple points of lubrication at predetermined intervals and/or in predetermined amounts. Lincoln Industrial sells such automated systems under the Quicklub®, Centro-Matic®, and Helios® trademarks. The Quicklub® system includes a reservoir for holding a supply of lubricant, a stirrer for stirring the lubricant, and an electric or pneumatic pump for pumping lubricant from the reservoir to one or more progressive metering (divider) valves each of which operates to dispense lubricant to multiple points of lubrication. Reference may be made to U.S. Pat. No. 6,244,387, incorporated herein by reference, for further details regarding an exemplary Quicklub® system. The Centro-Matic® system is similar to a Quicklub® system except that lubricant from the pump is delivered through a single supply line to injectors each operating to dispense a metered amount of lubricant to a single lubrication point. Reference may be made to U.S. Pat. No. 6,705,432, incorporated herein by reference, for further details regarding an exemplary Centro-Matic® system. The Helios® system is a dual line system.

Grease manufacturers have developed grease formulations with extreme pressure additives for heavy industrial markets. These additives react with bearings under high loads to prevent metal-to-metal contact, thereby reducing wear on the bearings. The additives generally include solid particles blended into grease. In some embodiments, additives include molybdenum disulfide and calcium carbonate blended into the grease. Although these additives reduce bearing wear, they act as an abrasive in lubrication pumps. In particular, the additives wear the pistons in the pumps during repetitive back and forth pumping action under high pump pressures. Piston wear can prevent pumps from producing adequate pressures and dispensing grease. Thus, there is a need for systems and methods for predicting and estimating piston wear so corrective actions can be taken before the pumps fail.

SUMMARY OF THE INVENTION

In one aspect the present invention is directed to a method of diagnosing piston wear in an axial piston pump. The pump has a piston driven by a motor to reciprocate axially within a cylinder through a pumping stroke and a filling stroke and through a home position. In the home position, the piston overlaps a test port in the cylinder and a pressure face of the piston is positioned a predetermined distance from the test port. The method comprises the steps of driving the pump to achieve a predetermined pressure and stopping the pump with the piston in its home position. The method further includes measuring pressure at the test port at a preselected time interval after the step of stopping the pump. An amount of piston wear is approximated based on a difference between the predetermined pressure and the measured pressure at the predetermined time interval.

In another aspect, the present invention is directed to a method of diagnosing piston wear comprising the steps of driving the pump to achieve a predetermined pressure, stopping the pump with the piston in its home position, and measuring pressure at the test port at a preselected time interval after the step of stopping the pump. An indexed piston position, in which the piston is retracted a preselected indexing distance from the immediately preceding position at which the piston was stopped for measuring pressure, is calculated. The pump is driven again to achieve the predetermined pressure and stopped with the piston in the calculated indexed position. Pressure is measured at the test port at the preselected time interval after stopping the pump. The steps of calculating indexed piston position, driving the pump, stopping the piston in the calculated indexed position are repeated until the measured pressure reaches a preselected pressure indicating a known amount of wear has occurred.

The above summary is provided to introduce a selection of concepts in simplified form that are further described below in the Detailed Description. The summary is not intended to identify key features or essential features of the claimed subject matter, nor is it intended to be used as an aid in determining the scope of the claimed subject matter. Other objects and features will be in part apparent and in part pointed out hereinafter.

BRIEF DESCRIPTION OF THE DRAWINGS

Corresponding parts are indicated by corresponding reference numbers throughout the drawings.

DETAILED DESCRIPTION

Figure 1:
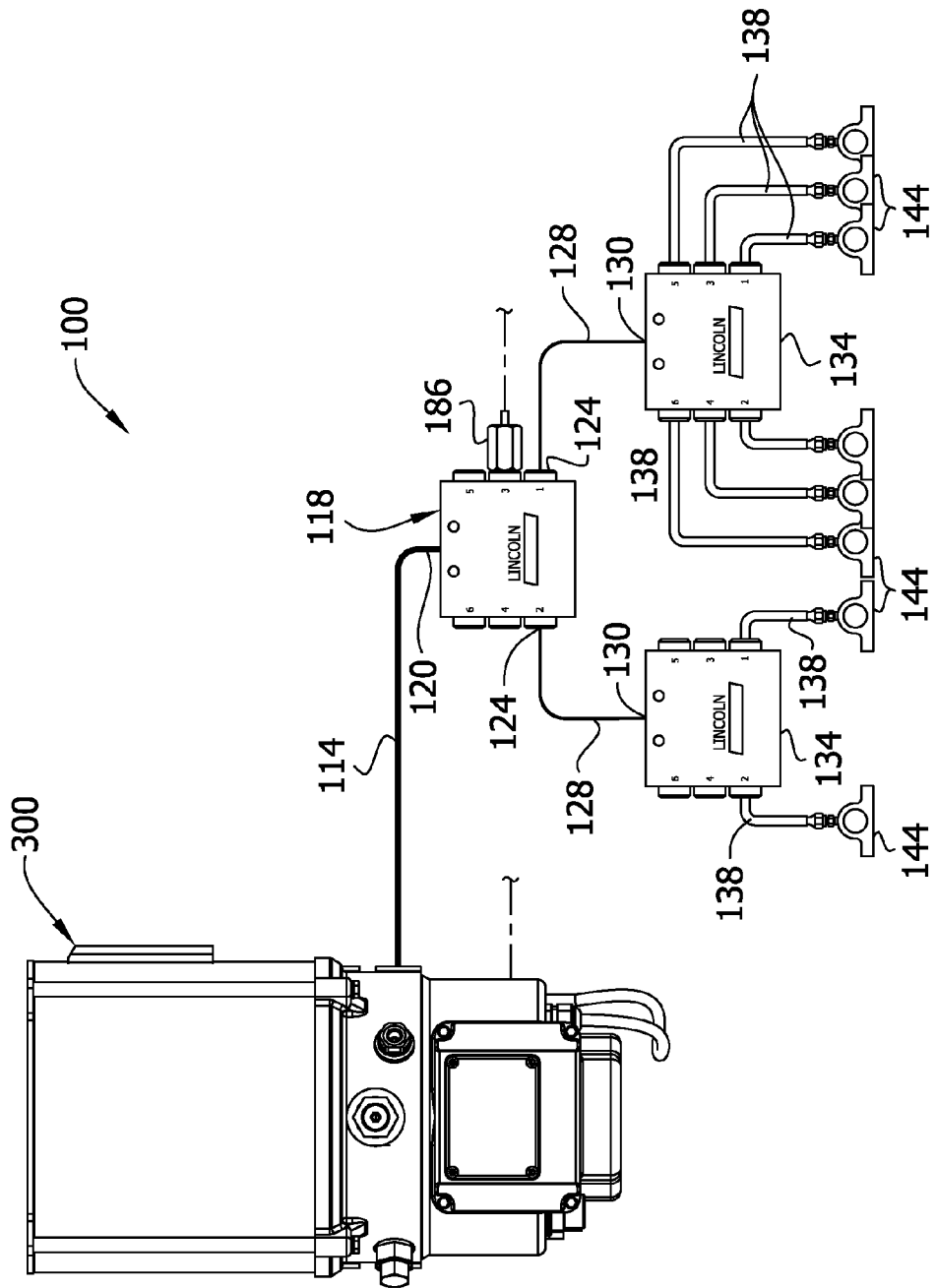
FIG. 1 is a diagrammatic view of a conventional automated lubrication system including divider valves for directing lubricant to points of lubrication.

FIG. 1 illustrates a conventional Quicklub® system, generally designated 100, comprising a pump unit 300 that operates to pump lubricant through a lube supply line 114 to a master divider valve, generally designated by 118, having an inlet 120 and multiple outlets 124 connected via lines 128 to the inlets 130 of additional (slave) divider valves, generally designated by 134. The divider valves 134 are connected via lines 138 to bearings 144 or other points of lubrication. The number of divider valves 134 used will vary depending on the number of lubrication points to be serviced.

Figure 2:
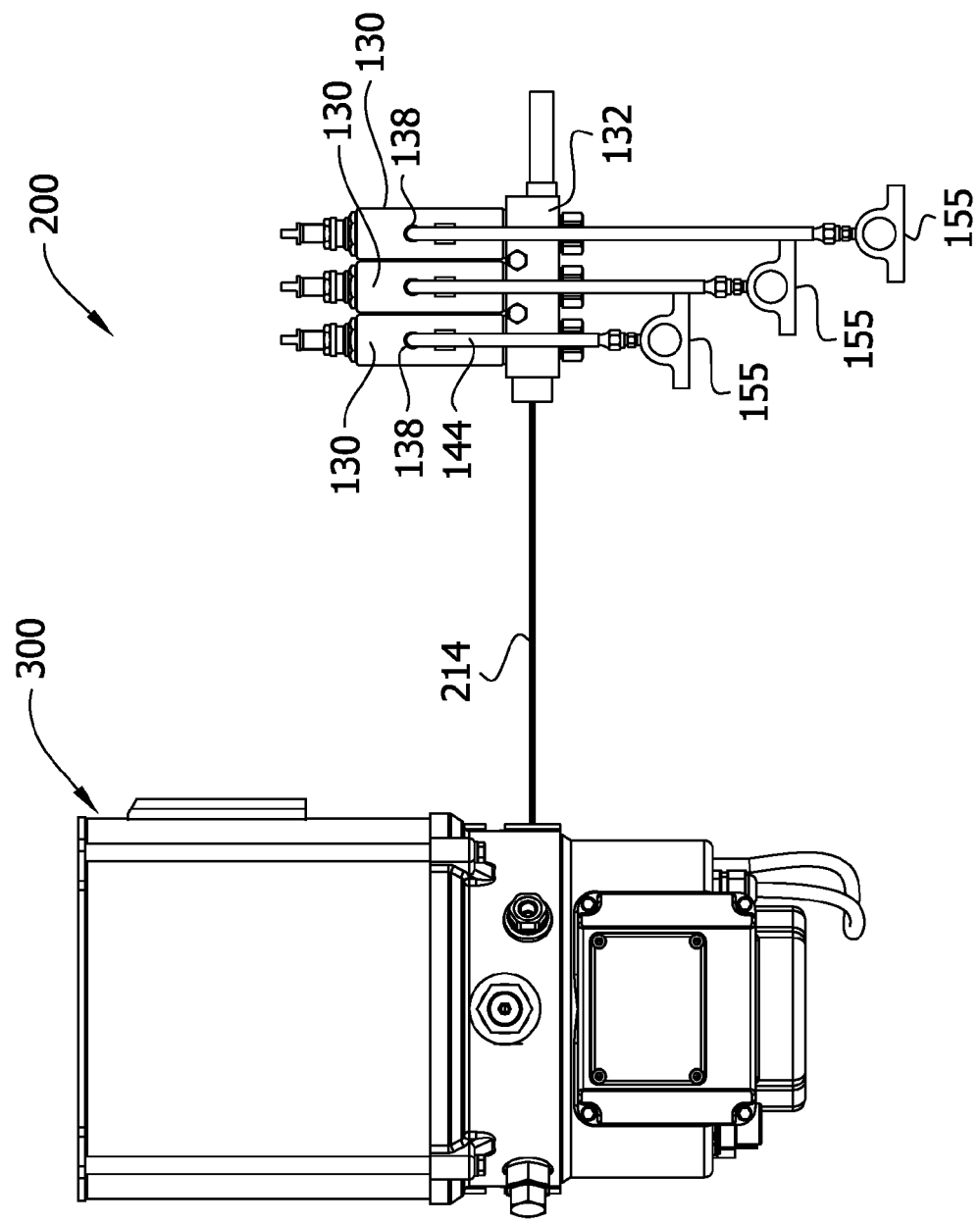
FIG. 2 is a diagrammatic view of a conventional automated lubrication system including injectors for directing lubricant to points of lubrication.

FIG. 2 illustrates a conventional Centro-Matic® system, generally designated 200, comprising a pump unit 300 that operates to pump lubricant through a lube supply line 214 to a plurality of injectors 130, each of which has an inlet communicating with the lube supply line 214 via passages in a manifold 132 and an outlet 138 connected via a line 144 to a bearing 155 or other point of lubrication.

Figure 4:
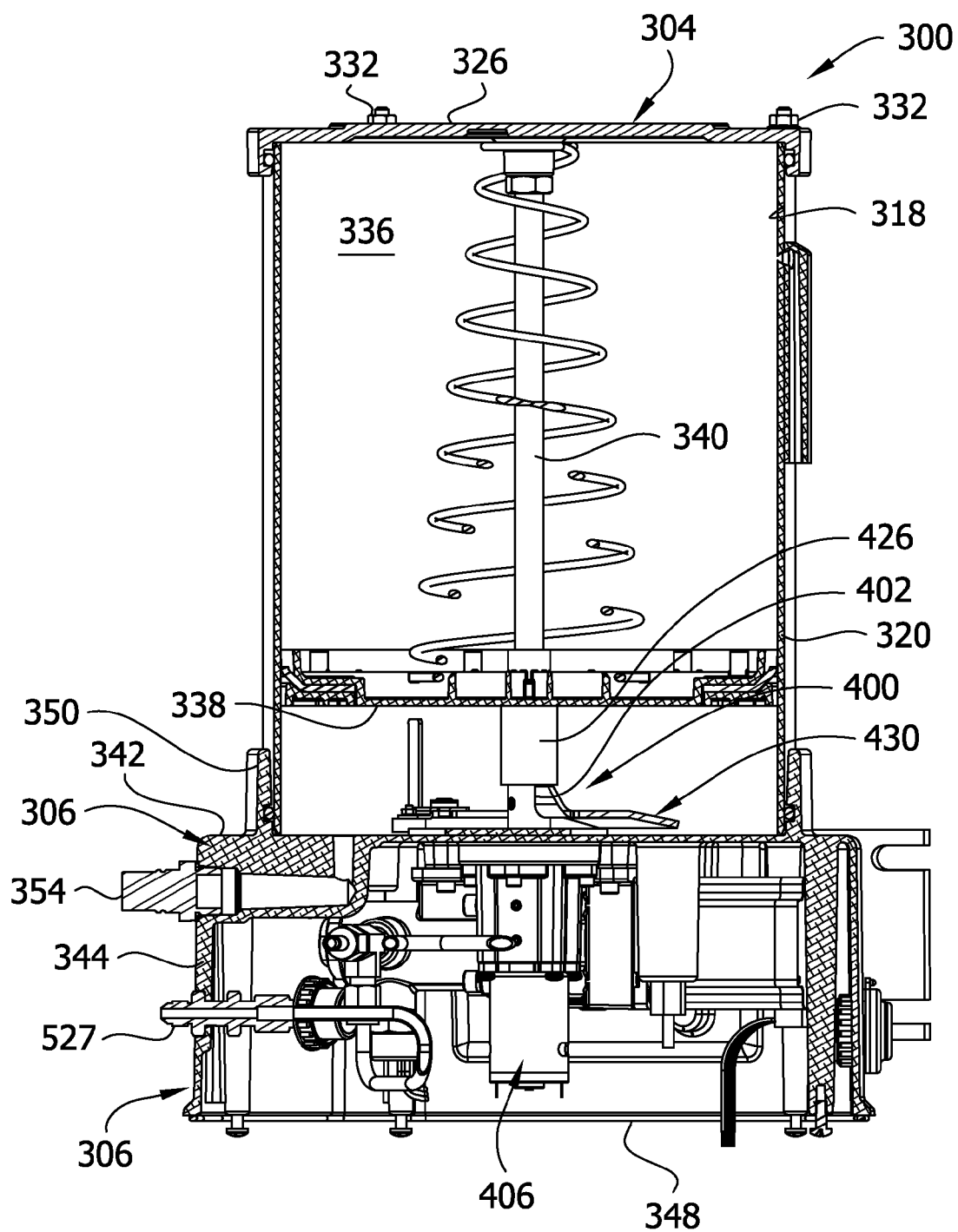
FIG. 4 is a vertical section taken through the pump unit illustrating a refill port for refilling a reservoir of the unit.
Figure 5:
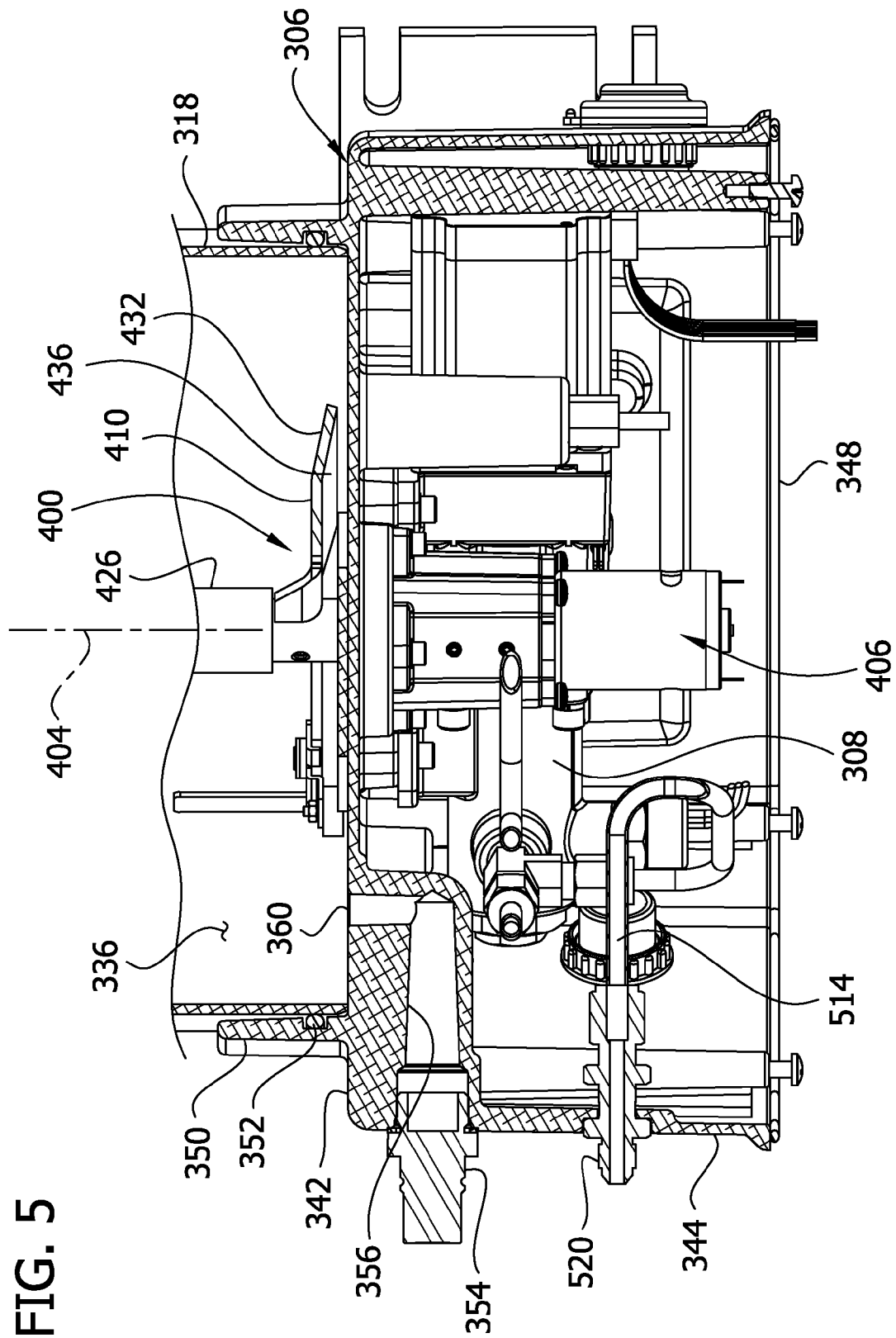
FIG. 5 is an enlarged portion of FIG. 4.
Figure 6:
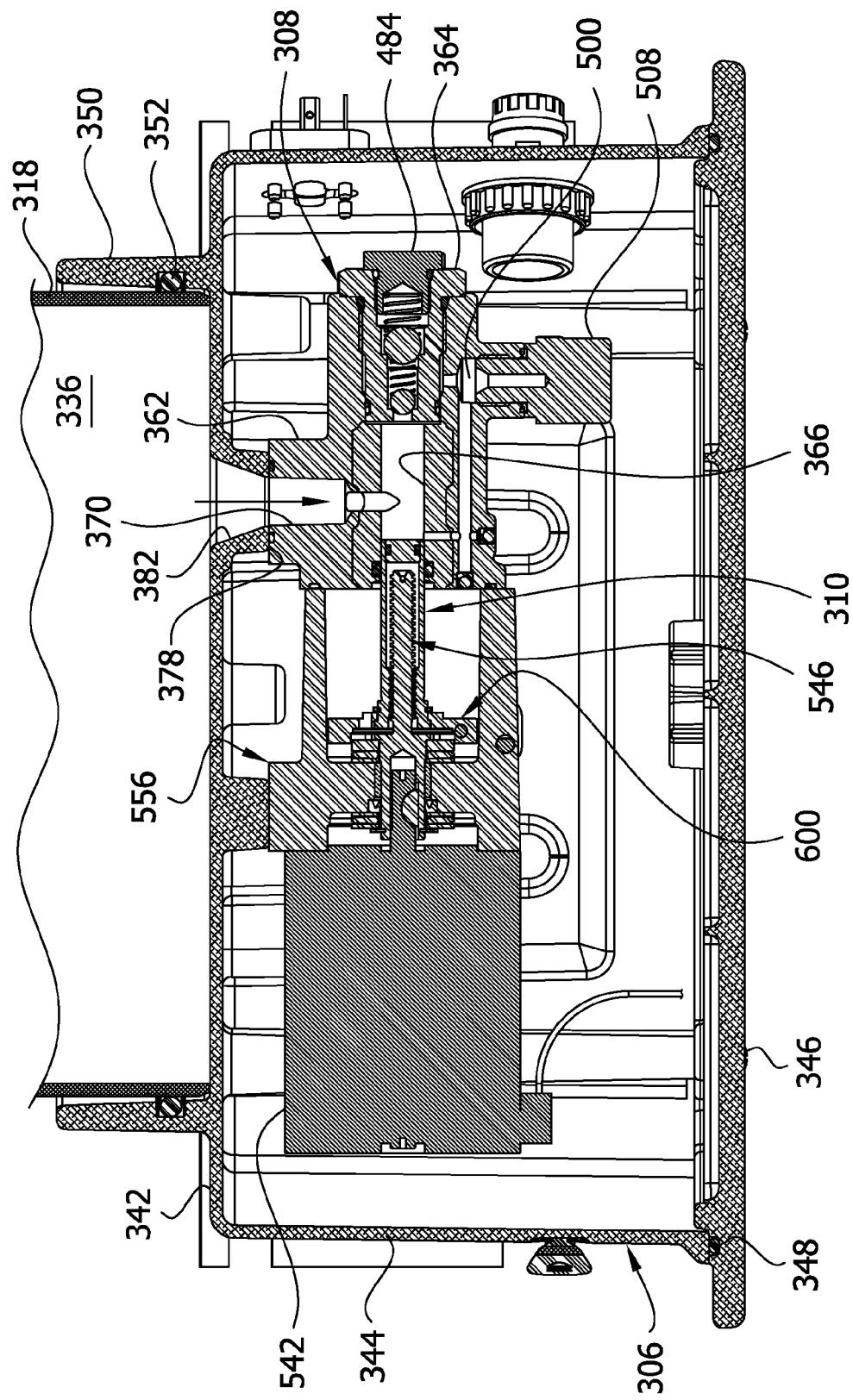
FIG. 6 is a vertical section taken through the pump unit illustrating a linear drive mechanism of the pump unit.

FIGS. 3-14 illustrate apparatus of the present invention comprising a pump unit 300 for supplying lubricant to different types of lubricant distribution systems (e.g., progressive systems, injector systems, CAN bus systems, dual line systems and combinations thereof). In general, the pump unit 300 comprises a reservoir, generally designated by 304, for holding a supply of lubricant (e.g., grease) and a pump housing, generally designated by 306, below the reservoir for housing various pump components of the unit. For example, as shown in FIG. 6, the pump components housed in the housing 306 include a pump cylinder, generally designated by 308, and a piston, generally designated by 310 movable back and forth in the cylinder. Other components will be described below.

Figure 3:
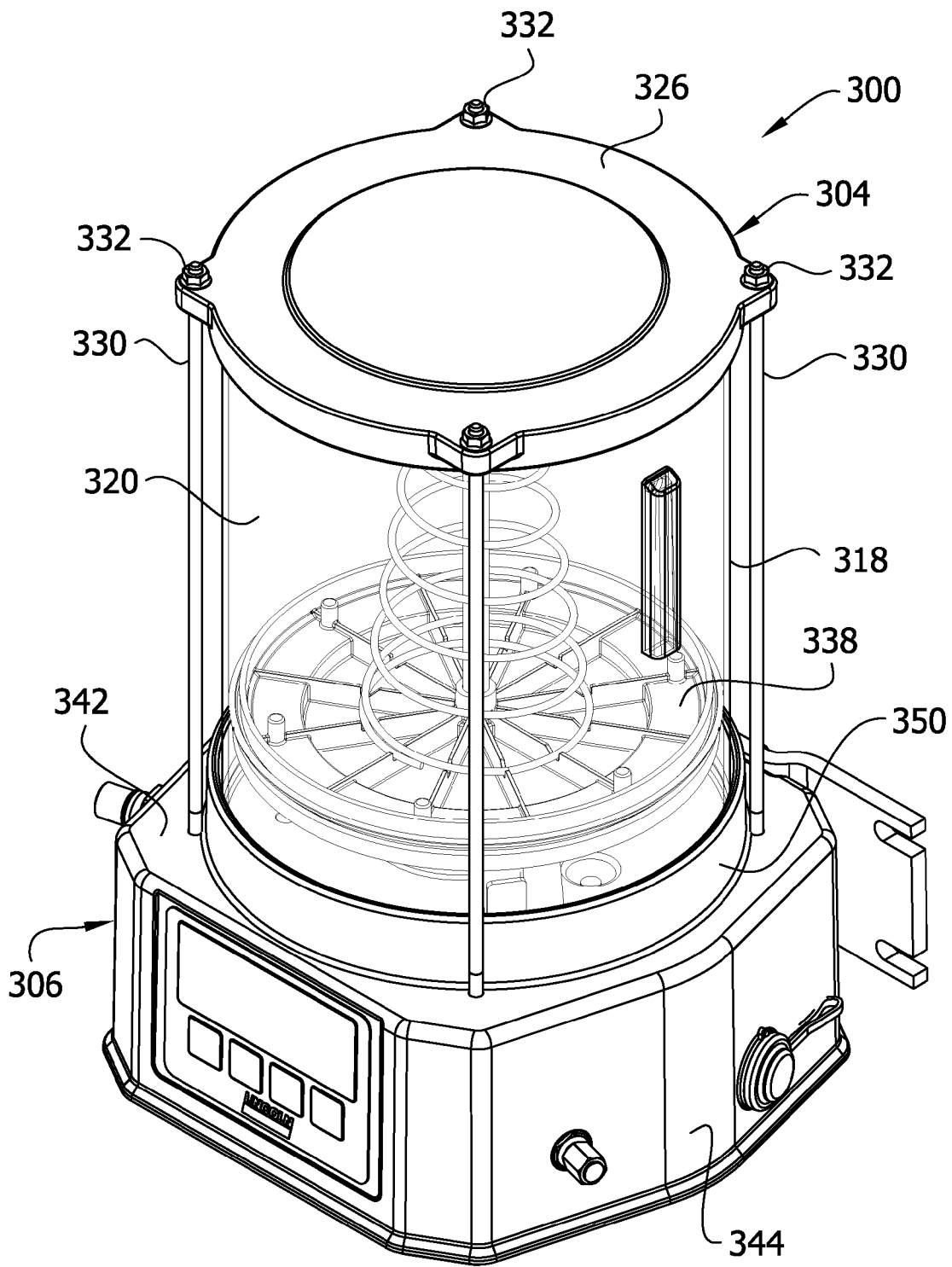
FIG. 3 is a perspective of a pump unit.

Referring to FIGS. 3 and 4, the reservoir 304 comprises a tank 318 having a side wall 320 and a removable top 326. The lower end of the side wall 320 rests on the pump housing 306, which forms a bottom of the tank 318. A number of tie rods 330 connect the cover 326 to the pump housing 306 and hold the tank in place on the housing. The cover 326 can be removed by unthreading nuts 332 from the tie rods 330. The tank 318 has an interior 336 for holding a supply of lubricant (e.g., grease). A spring-loaded follower 338 mounted on a central vertical shaft 340 in the tank 318 bears against the grease and wipes against the inside surface of the tank as the level of grease falls during operation of the pump unit 300.

Referring to FIGS. 4 and 5, the pump housing 306 comprises a top wall 342, a side wall 344 forming a skirt depending from the top wall, and bottom cover 346 (FIG. 6) fastened to the housing. A seal 348 is positioned between the bottom cover and the housing 306 to maintain a dry environment inside the housing. A collar 350 extends up from the top wall 342 and is sized for receiving the lower end of the reservoir tank 318. A seal 352 on the collar 350 engages the side wall 320 of the tank to prevent leakage. A refill port 354 is provided on the housing 306 for refilling the tank 318 with lubricant. A refill conduit 356 connects the refill port 354 to an outlet opening 360 in the top wall 342 of the housing. The outlet opening 360 communicates with the interior 336 of the tank 318 for refilling the tank with lubricant. In a dual line system, the refill port 354 is connected to the return line to provide access to the tank 318 and to supply to the tank the lubricant provided by the return line.

Figure 7:
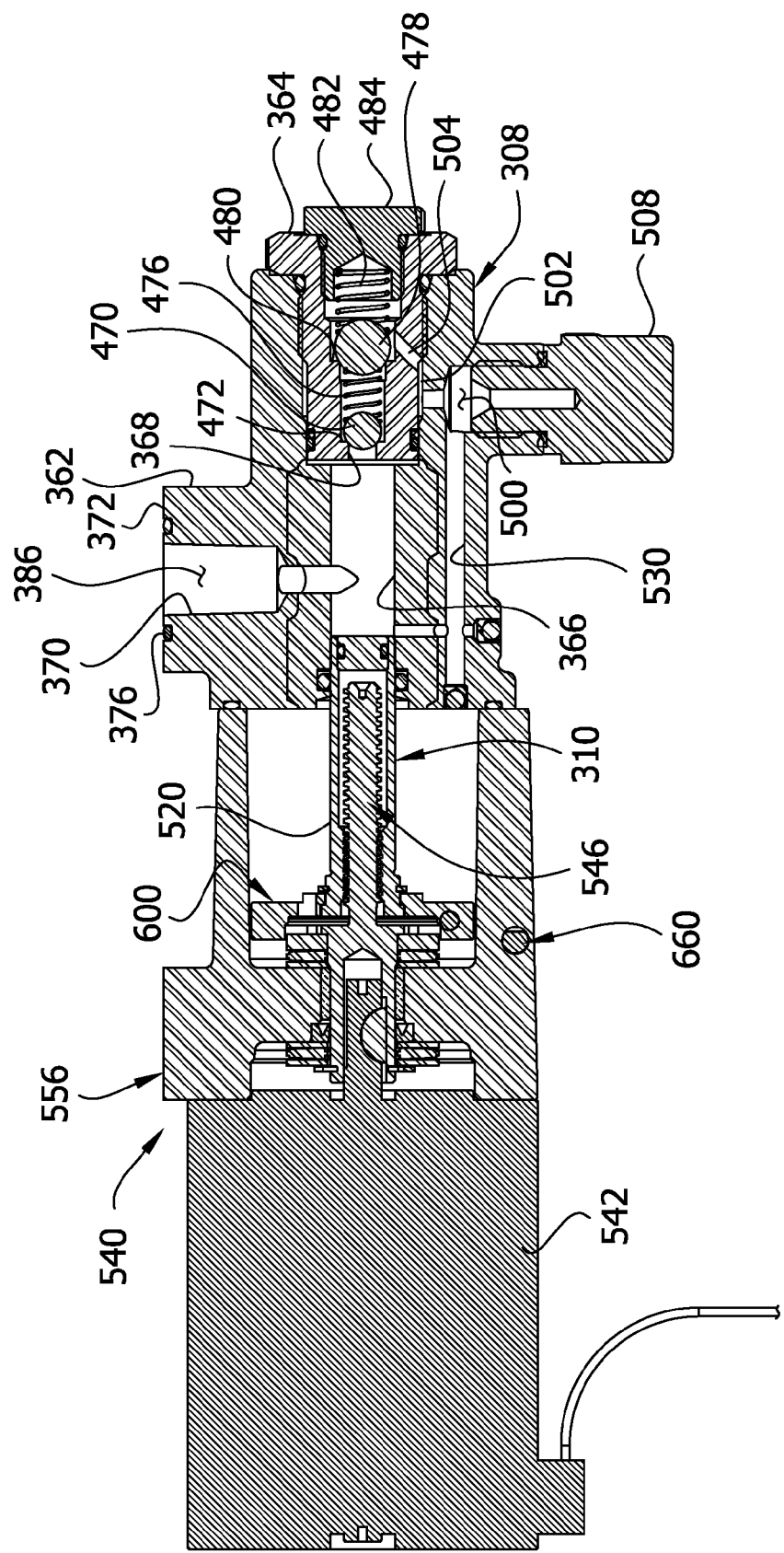
FIG. 7 is an enlarged portion of FIG. 6 illustrating the linear drive mechanism.

As shown in FIG. 6, the pump cylinder 308 is mounted in the pump housing 306 immediately below the top wall 342 of the housing. As shown in FIGS. 6 and 7, the pump cylinder 308 comprises a cylinder body 362 and a valve housing 364 in threaded engagement with the cylinder body. The cylinder body 362 is illustrated as being of two-piece construction, but it may comprise any number of parts. The cylinder body 362 and valve housing 364 have co-axial longitudinal bores indicated at 366 and 368, respectively. The piston 310 reciprocates in the bore 366. The bore 368 in the valve housing 364 has multiple diameters to accommodate various check valve components, as will be described later.

The cylinder body 362 has an inlet comprising an inlet passage 370 extending from a face 372 of the body to the cylinder bore 366. The face 372 sealingly engages (via seal 376 in FIG. 8) an opposing face 378 of the top wall 342 of the pump housing 306. The top wall 342 of the pump housing has an opening 382 aligned with the inlet passage 370 to form a defined tunnel-like flow path 386 from the interior 336 of the tank 318 to the cylinder bore 366. The flow path 386 is closed along its entire length from the interior of the tank 336 to the cylinder bore 366. Desirably, the flow path 386 is a generally straight-line path extending generally vertically from an upper end of the flow path to a lower end of the flow path. Further, the total length of the defined flow path 386 is desirably relatively short.

Figure 8:
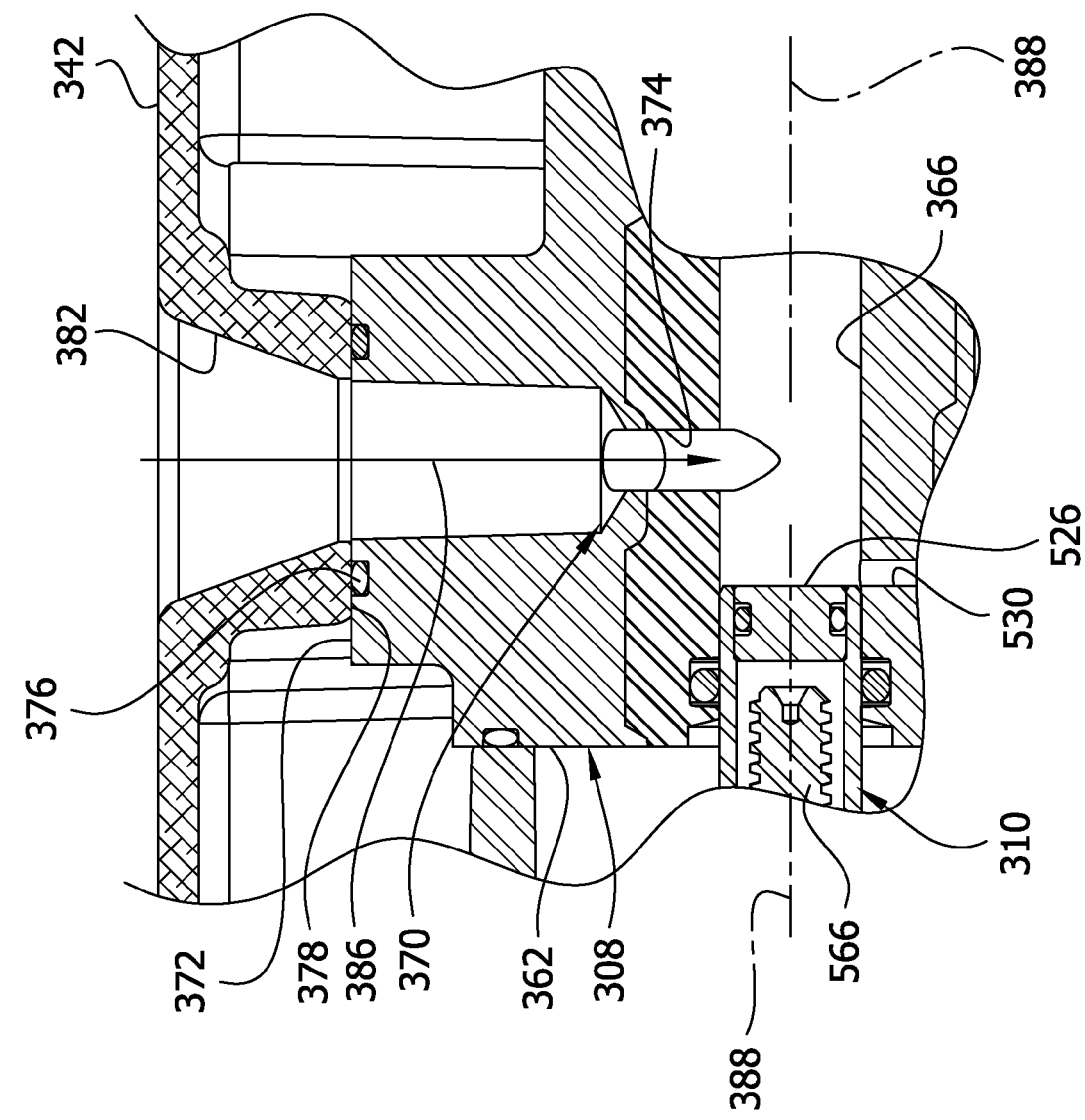
FIG. 8 is an enlarged portion of FIG. 7 showing a cylinder inlet of the drive mechanism.

Referring to FIG. 8, the opening 382 in the top wall 342 of the pump housing 306 is generally conical and defines an outlet of a tank 318. The opening 382 has a large-diameter upper end to facilitate flow of lubricant from the tank 318 into the opening and a smaller-diameter lower end. The tapered opening 382 funnels lubricant into the inlet passage 370 of the cylinder 308.

The cylinder inlet passage 370 has an upper portion that is substantially cylindrical (with a small taper to facilitate manufacture) and co-axial with the opening 382 in the top wall 342 of the housing 306. The inlet passage 370 also has a lower portion 374 that is oblong (e.g., racetrack-shaped) as viewed in horizontal cross-section (see FIGS. 9 and 10). The oblong portion 374 has a major dimension that is about equal to the full diameter of the cylinder bore 366 at the juncture of the inlet passage 370 and the cylinder bore, and a shorter minor dimension generally parallel to the longitudinal centerline of the cylinder bore that is less than the full diameter of the cylinder bore 366. The oblong configuration maximizes the area of flow into the cylinder bore 366 and reduces the effective length of the piston power stroke (i.e., the segment of the power stroke after the piston 310 has passed the cylinder inlet passage 370 and blocked communication between the bore 366 and the inlet passage). As a result, the pump unit 300 has a more compact design, but pumps a relatively large volume of lubricant (e.g., at least 1.5 cubic centimeters) per pumping stroke of the piston 310.

Figure 10:
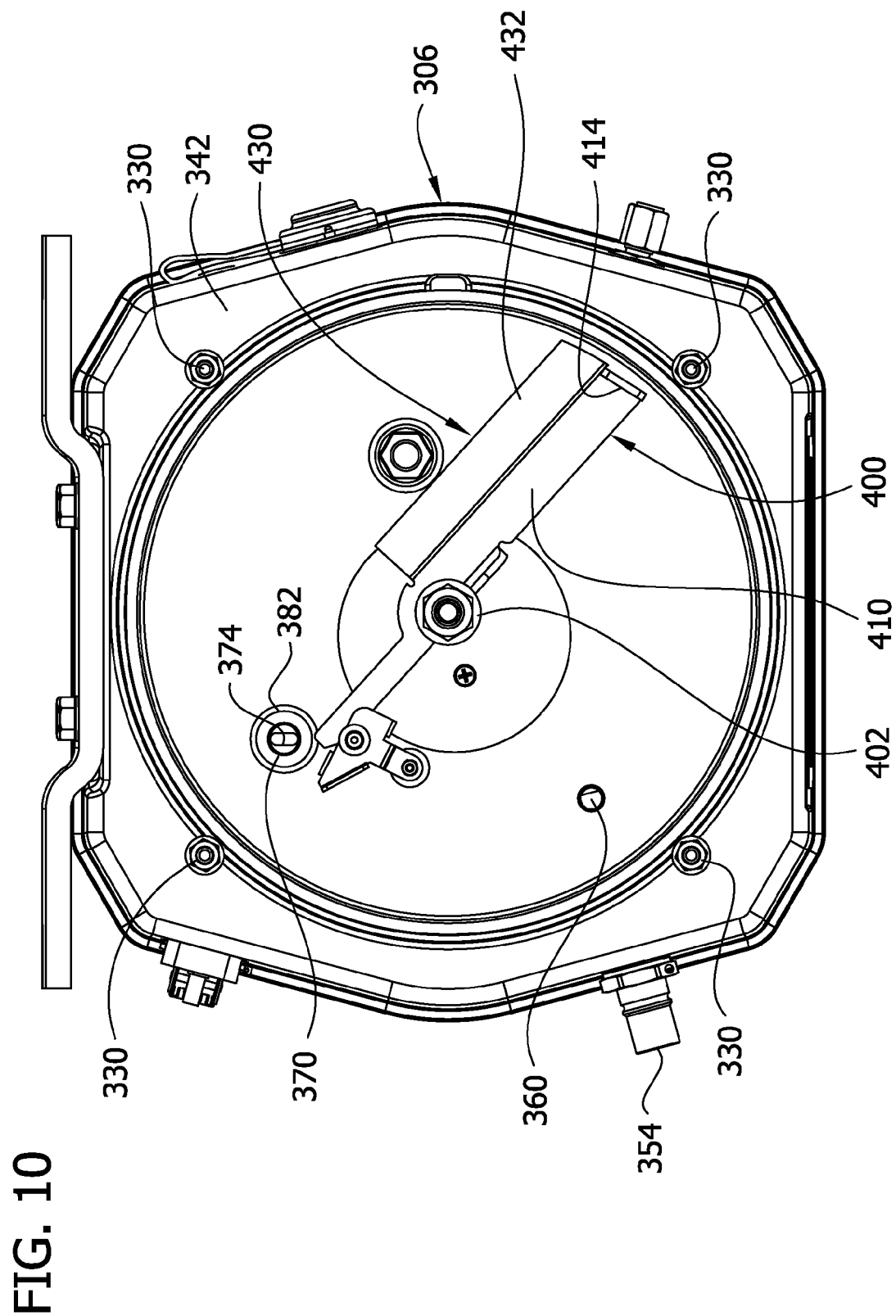
FIG. 10 is a plan of a stirring mechanism of the pump unit.
Figure 11:
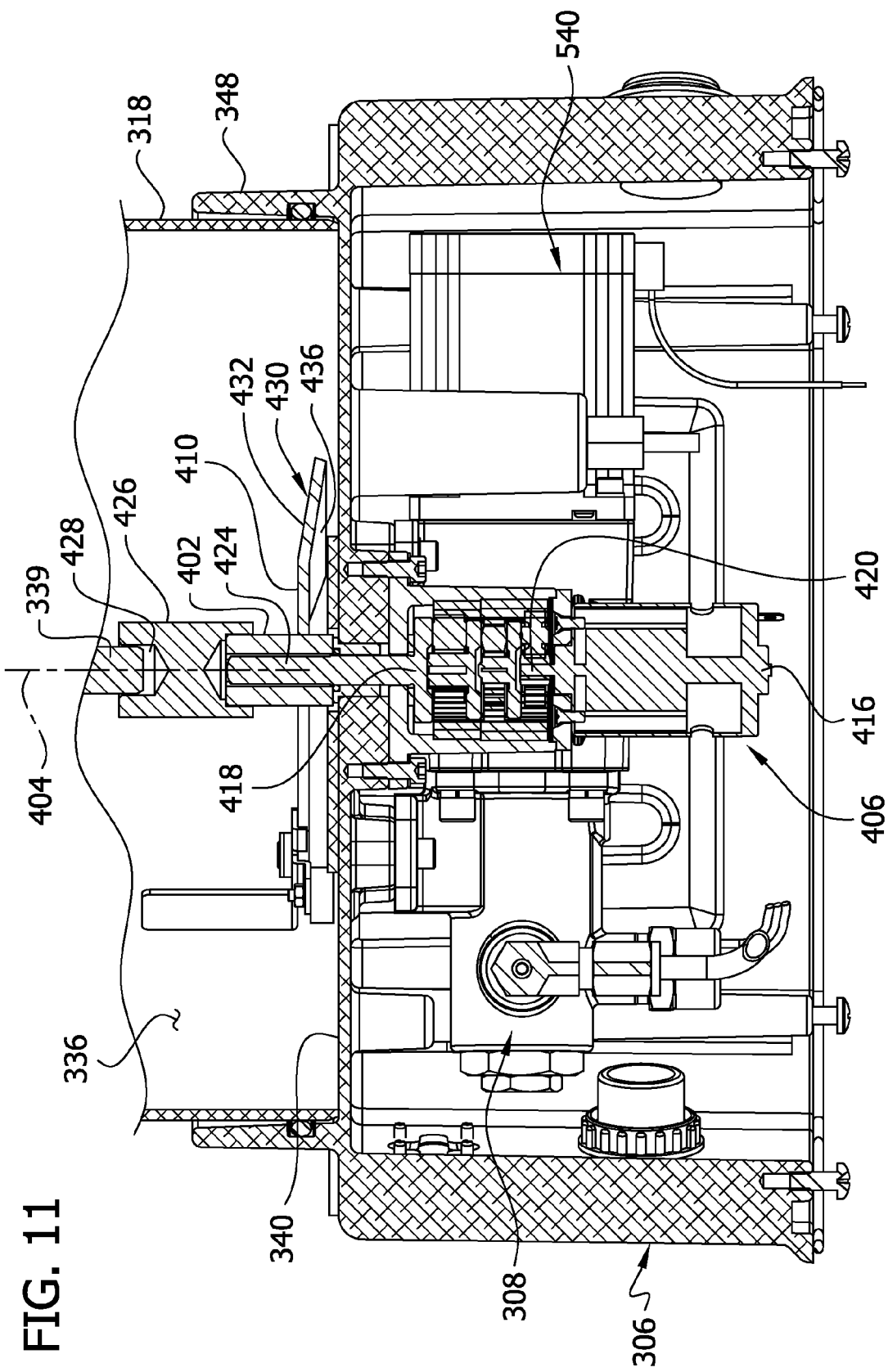
FIG. 11 is a vertical section taken through the drive motor and related components of the stirrer.

Referring to FIGS. 4, 10, and 11, a stirrer, generally designated 400, is provided for stirring lubricant in the tank 318. The stirrer 400 comprises a rotary hub 402 rotatable about a vertical axis 404 by a first drive mechanism 406 in the pump housing 306. An arm 410 extends generally horizontally outward from the hub 402 adjacent the bottom of the tank 318. A vertical stirring member 414 at the outer end of the arm 410 extends up beside the cylindrical side wall 320 of the tank 318. The stirrer 400 rotates to fluidize lubricant in the tank and break up any air bubbles that may be in the lubricant to minimize the risk that the pump unit 300 will lose its prime.

Referring to FIG. 11, the stirrer drive mechanism 406 comprises an electric motor 416 and a transmission 418 connecting the output shaft 420 of the motor to the hub 402 of the stirrer 400. Rotation of the output shaft 420 acts through the transmission 418 to rotate the stirrer 400 about the vertical axis 404 at a suitable speed (e.g., 40-60 rpm.) The stirrer hub 402 is affixed to an output 424 shaft of the transmission (e.g., by a setscrew) so the hub rotates in unison with the output shaft. A collet 426 at the upper end of the stirrer hub 402 supports the lower end of the follower shaft 340. The collet 426 is affixed to the stirrer hub by suitable means (e.g., a setscrew) so that it rotates in unison with the stirrer hub. The lower end of the follower shaft 340 is received in an opening 428 in the upper end of the collet 426 and remains stationary as the collet rotates with the hub 402.

The stirrer 400 includes a force-feed mechanism 430 operable on rotation of the stirrer to force lubricant under pressure from the tank through the tank outlet, i.e., through opening 382. As illustrated in FIG. 5, the force-feed mechanism 430 comprises a force-feed member 432 on the arm 410 of the stirrer. The force-feed member 432 extends along the arm and has a downwardly inclined lower surface 436. The force-feed member 432 terminates at a lower end 438 spaced a relatively short distance (e.g., 0.16 in.) above the wall 342. Rotation of the stirrer 400 causes the angled force-feed member 432 to move through the lubricant and tending to push lubricant down through the opening 382 in the top wall 342 of the pump housing 306 and along the defined flow path 370 to the cylinder bore 366.

The downward pushing force exerted on the lubricant by the force-feed mechanism 430 is complemented by a pulling force exerted on the lubricant by the piston 310 of the pump as it moves through a return stroke. It will be understood in this regard that movement of the piston 310 through a return stroke generates a reduced pressure in the cylinder bore 366 tending to pull lubricant down along the flow path 370 toward the cylinder bore. Desirably, the controller of the pump unit 300 is programmed to operate the stirrer 400 and the piston 310 simultaneously so the pushing and pulling forces act in concert to move lubricant along the defined flow path 370 into the cylinder bore 366. When combined, these forces are able to move lubricant more forcefully from the reservoir to the cylinder bore. Further, these forces are maximized because the flow path 370 from the interior of the tank 336 to the cylinder bore 366 is closed to atmosphere along its entire length. As a result, the pump unit 300 is able to pump more viscous lubricants at lower temperatures than conventional pump units.

Referring to FIG. 7, a first ball check valve 470 is mounted in the valve housing 364 for movement in bore 368 between a closed position in which it engages a first valve seat 472 on the housing to block flow through the cylinder bore 366 during a return stroke of the piston 310 and an open position in which the ball allows flow through the bore during a pumping stroke of the piston. A first coil compression spring 476 reacting at one end against the ball valve 470 urges the ball toward its closed position. The opposite end of the spring 476 reacts against a second ball check valve 478 downstream from the first ball valve 470. The second ball valve 478 is mounted in the valve housing 364 for movement in bore 368 between a closed position in which it engages a second valve seat 480 on the housing to block flow through the cylinder bore 366 during a return stroke of the piston 310 and an open position in which it allows flow through the bore during a pumping stroke of the piston. A second coil compression spring 482 reacting at one end against the second ball valve 478 urges the ball toward its closed position. The opposite end of the spring 482 reacts against a plug 484 threaded into the downstream end of the bore 368. The use of two check valves 470, 478 instead of only one check valve reduces the potential of lubricant flowing back into the cylinder bore 366 during a return stroke of the piston 310.

Figure 13:
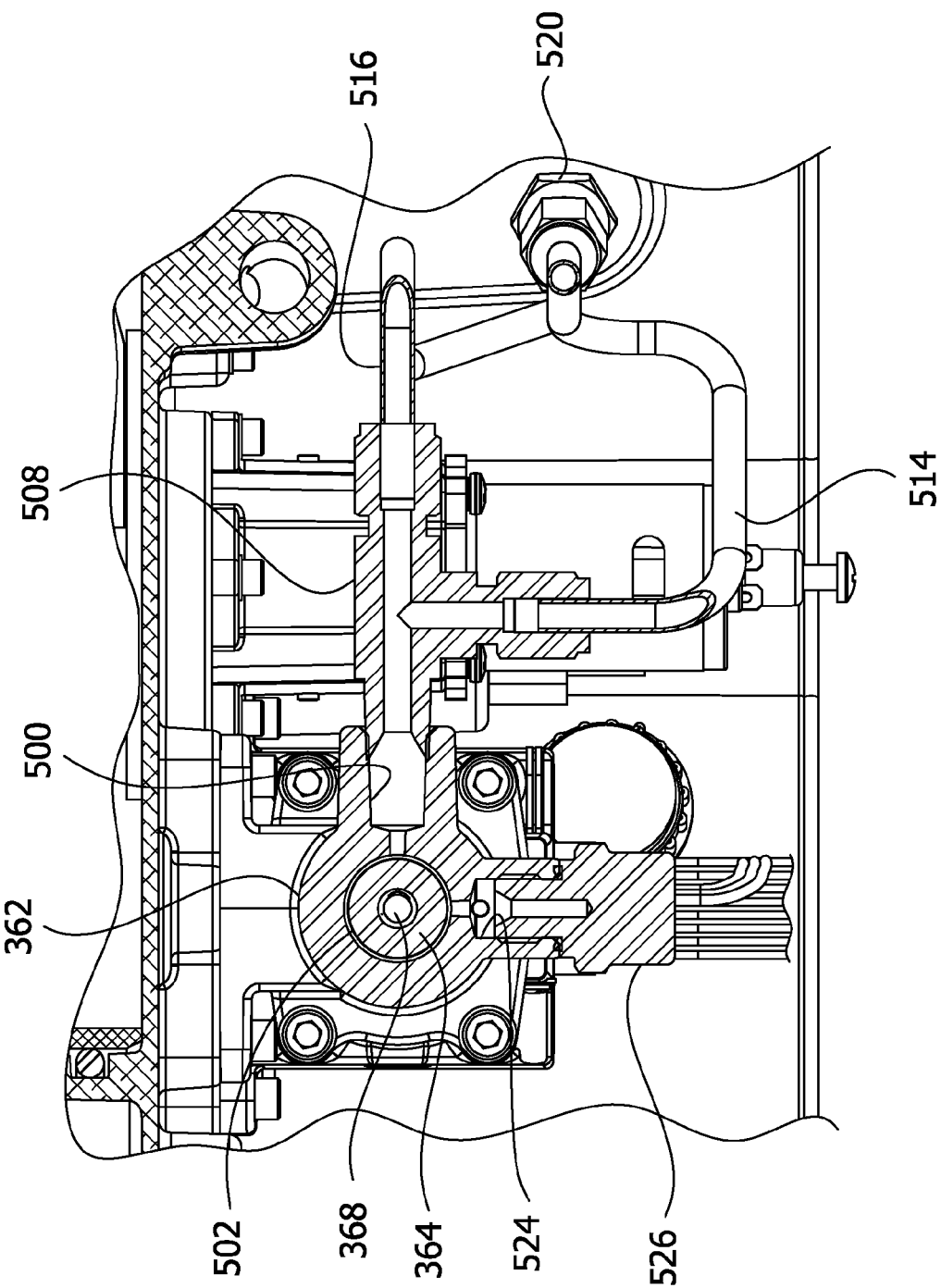
FIG. 13 is an enlarged vertical section taken in the plane of 13-13 of FIG. 12.

Referring to FIGS. 7 and 13, the pump cylinder 308 has an outlet comprising an outlet port 500 in the cylinder body 362. The outlet port 500 communicates with the cylinder bore 366 via an annular gap 502 located between the valve housing 364 and the cylinder body 362 and via a connecting passage 504 extending between the annular gap and the bore 368 in the valve housing at a location downstream from the second ball check valve seat 480. A lubricant outlet fitting 508 is threaded into the outlet port 502. In the illustrated embodiment, the outlet fitting 508 is a T-fitting for flow of lubricant to a first feed line 514 attached to the pump housing 306 at one location and to a second feed line 516 attached to the pump housing at a second location spaced around the housing from the first location. The outlet end of each feed line 514, 516 is equipped with a self-sealing quick connect/disconnect connector 520 to facilitate connecting the feed line to a lube supply line supplying lubricant to a distribution system of one kind of another. In general, only one of the two feed lines is used for any given distribution system, the feed line selected for use being the most suitable configuration for conditions in the field. However, both feed lines may be used in some installations.

Figure 12:
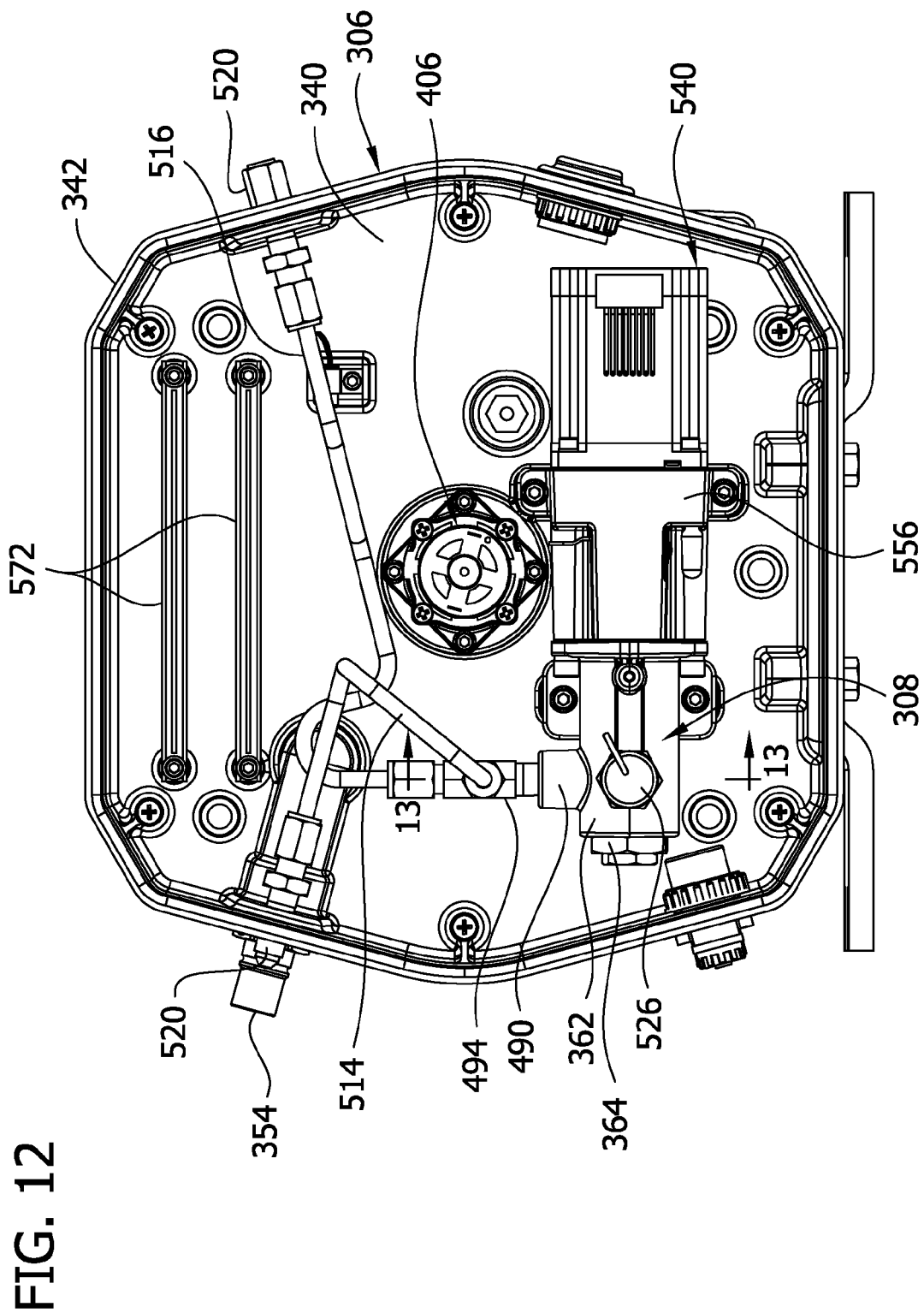
FIG. 12 is a bottom plan of the pump unit.

Referring to FIGS. 12 and 13, the cylinder body 362A also has a sensor port 524 communicating with the bore 368 by way of the annular gap 502 and the connecting passage 504. A pressure sensor 526 threaded in the sensor port senses the pressure at the outlet end of the cylinder bore 366 and sends a signal corresponding to the sensed pressure to a programmable microprocessor 572.

As shown in FIG. 7, a vent passage 530 in the cylinder body 362 provides fluid communication between a first location in the longitudinal cylinder bore 366 upstream from the first check valve seat 472 and a second location in the longitudinal cylinder bore 368 downstream from the second check valve seat 480. The downstream end of the vent passage 530 communicates with the second location via the outlet port 500, the annular gap 502, and the connecting passage 504. The vent passage 530 permits lubricant to vent to the reservoir 304 during selected return strokes of the piston to allow injectors to reset for successive cycles of operation as will be described in more detail below. Other vent passage configurations are possible.

Referring to FIGS. 14-17, the piston 310 of the pump unit 300 comprises a hollow cylindrical piston body 520 having a front end (to the right as shown) and a back end (to the left as shown). The body 520 has internal threads 522 extending from generally adjacent the back of the body toward the front end of the body but desirably terminating well short of the front end. The front end of the piston body 1222 is closed by a piston head 526 with a circumferential seal 528 that engages the inside surface of the body.

The piston 310 is movable in a reciprocating manner in the cylinder bore 366 by a second drive mechanism, generally designated 540. The drive mechanism 540 is a linear position drive mechanism comprising a stepper motor 542 having an output shaft 544 connected to a co-axial lead screw 546 rotatable in a sleeve bearing 550 in an end wall 552 of a follower housing 556. The lead screw 546 comprises a lead screw body 560 having a blind bore 562 that receives the output shaft 544 of the stepper motor 542, and a threaded shaft 566 extending forward from the body. The shaft 566 has external threads 568 that mate with the internal threads 522 of the piston body 520. A key 570 connects the stepper motor output shaft 544 to the body 560 of the lead screw so that the shaft and lead screw turn in unison. Desirably, the mating threads on the piston and lead screw are constructed for the efficient transmission of power. By way of example, the threads 522, 568 may be full ACME threads capable of carrying a substantial load for pumping lubricant at high pressures.

Thrust loads exerted on the piston 310 and lead screw 546 are carried by first and second thrust bearings 574, 576 on opposite sides of the end wall 552 of the follower housing 556. The first thrust bearing 574 supports axial loads in the rearward direction (i.e., toward the left as viewed in FIG. 14) during a pumping stroke of the piston 310 as it moves forward in the cylinder bore 366. The thrust bearing 574 comprises a needle bearing 580 and two bearing races 582 held captive between the follower housing end wall 552 and a peripheral radial flange 584 on the lead screw body 560. The second thrust bearing 576 supports axial loads in the forward direction (i.e., toward the right as viewed in FIG. 14) during a return stroke of the piston 310 as it moves rearward in the cylinder bore 366. The thrust bearing 576 comprises a needle bearing 586 and two bearing races 588 held captive between the follower housing end wall 552 and a retaining ring 590 on the lead screw. A seal 592 in a counterbore in the follower end wall 552 immediately in front of the second thrust bearing 576 seals against the lead screw body 560 to prevent leakage.

A follower 600 is secured to the piston 310 for back and forth linear (non-rotational) movement of the follower and piston in a cavity 602 in the follower housing 556. The cavity 602 extends forward from the end wall 552 of the housing 556, located generally adjacent the back end of the housing, to the front end of the follower housing. In this embodiment, the longitudinal centerline of the cavity 602 is generally co-axial with the longitudinal centerlines of the piston 310 and lead screw 546. The front end of the follower housing 550 seals against the back end of the cylinder body 362 such that the longitudinal centerline of the cavity 602 is generally co-axial with the longitudinal centerline of the cylinder bore 366 and such that the piston 310 extends from the follower cavity into the cylinder bore for reciprocation in the cylinder bore 366.

Figure 16:
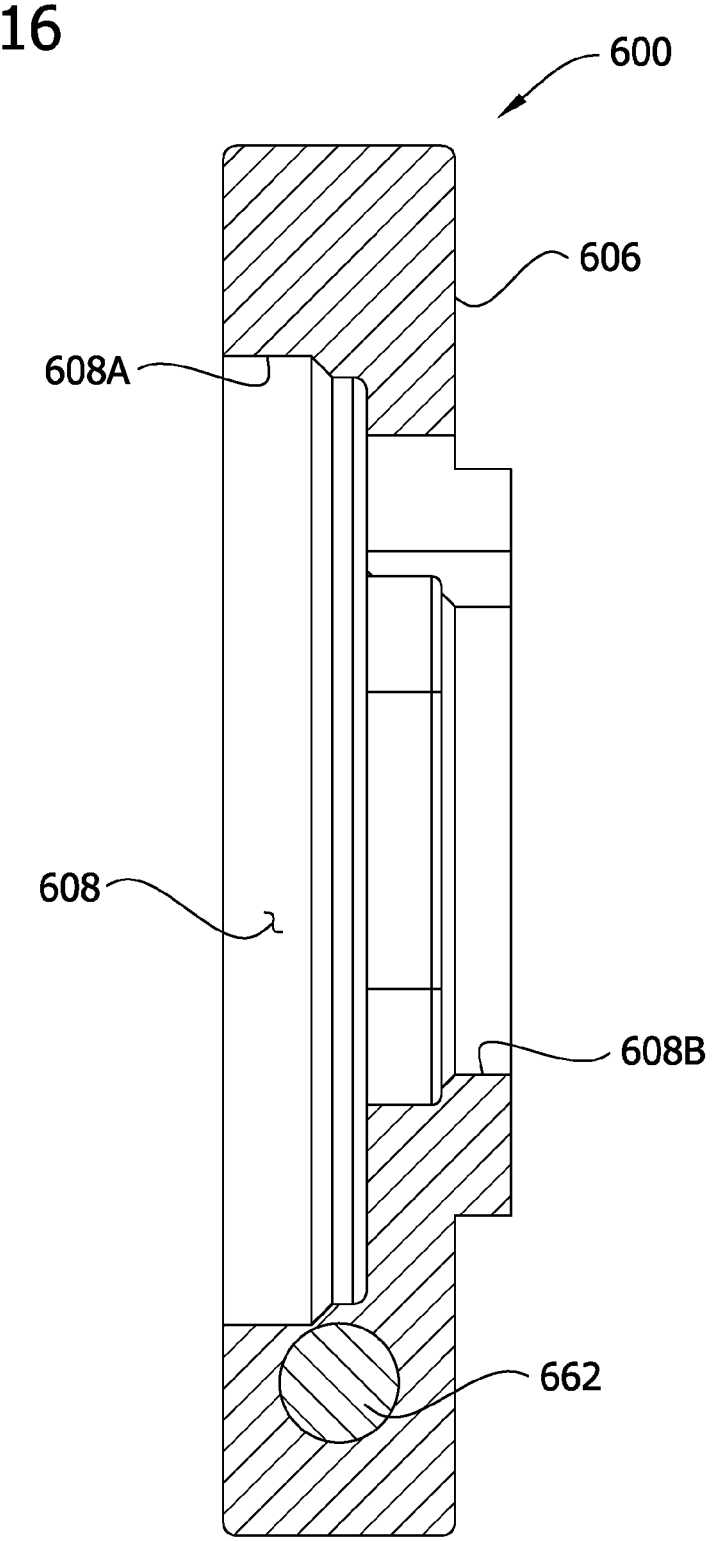
FIG. 16 is a sectional view of the follower.

As illustrated in FIG. 16, the follower 600 comprises a circular follower body 606 having a central bore 608 with a larger-diameter rear portion 608A that receives the peripheral flange 584 on the lead screw body 560 and part of the first thrust bearing 574, and a smaller-diameter forward portion 608B that receives a back end portion of the piston body 520. The smaller-diameter portion 608B of the follower bore 608 and the back end portion of the piston body 520 are non-circular (e.g., rectangular) to prevent relative rotational movement between the piston and the follower. Relative axial movement between the two parts is prevented by an inward-projecting peripheral flange 612 on the follower body 606 held captive between an outward-projecting peripheral flange 614 on the piston body and a retaining clip 620 on the piston body. Other constructions are possible to prevent relative rotation and linear movement between the piston 310 and follower 600.

Figure 17:
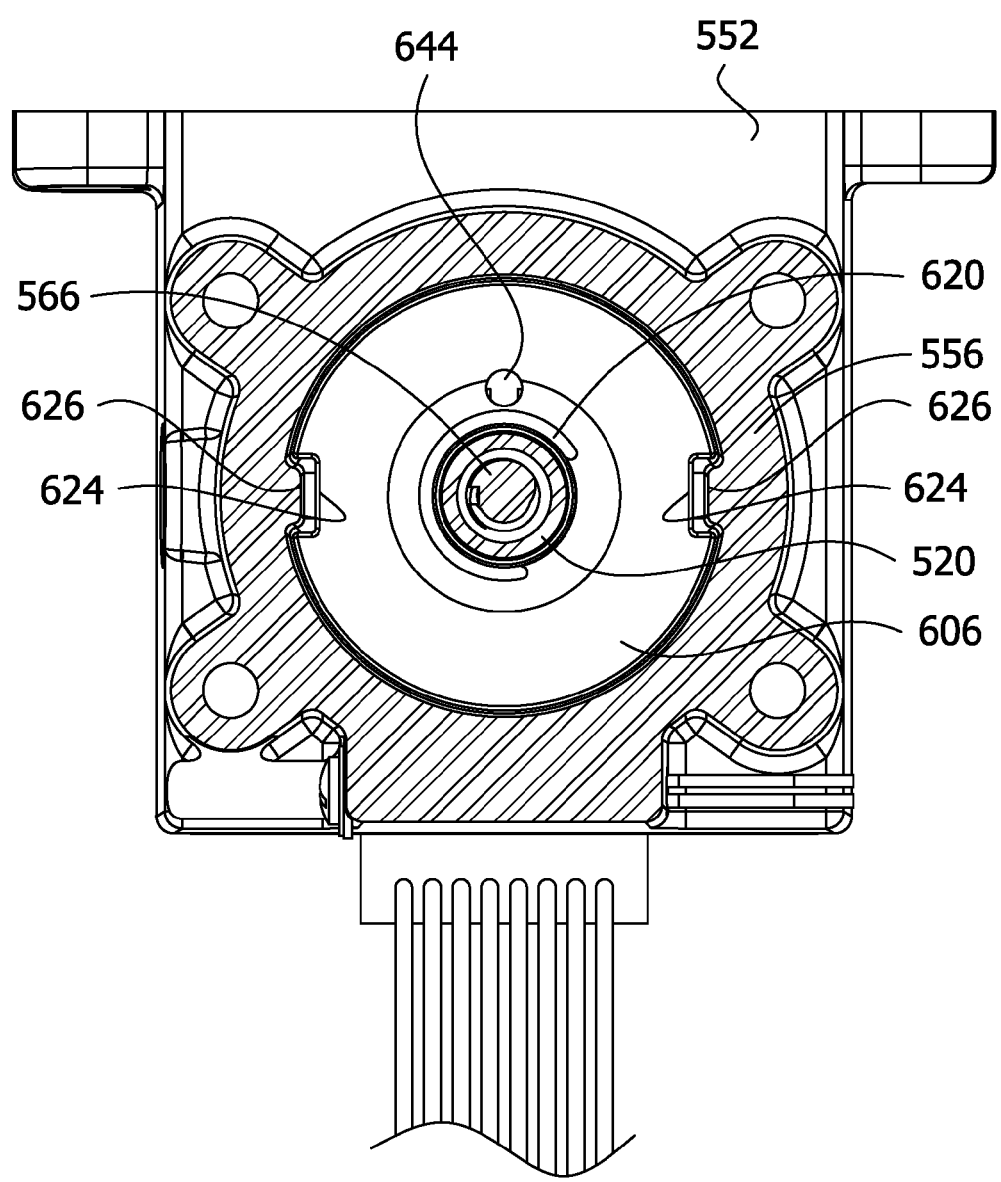
FIG. 17 is a vertical section taken in the plane of 17-17 of FIG. 7.

As illustrated in FIG. 17, the follower body 606 has notches 624 for receiving stationary linear guide rails 626 on the inside of the follower housing 556. The rails 626 extend in a direction generally parallel to the longitudinal cylinder bore 366 and hold the follower 600 (and piston 310) against rotation as the lead screw 546 is rotated by the stepper motor 542. As a result, rotation of the motor output shaft 544 and lead screw 546 in one direction causes the piston 310 to move linearly in the cylinder bore 366 through a pumping stroke, and rotation of the output shaft 544 and lead screw 546 in the opposite direction causes the piston to move linearly in the cylinder bore through a return stroke. The lengths of the pumping and return strokes are controlled by operation of the stepper motor 542 under control of the controller.

Desirably, the cavity 602 functions as a reservoir for holding a lubricant (e.g., oil) suitable for lubricating the threads 522, 568 on the lead screw 546 and the piston 310. Further, an oil-delivery mechanism is provided for delivering oil from the reservoir to the threads. In the illustrated embodiment, the oil-delivery mechanism comprises a portion of the lead screw 546 comprising the flange 584 on the lead screw body 560. The flange 584 is sized for immersion in the oil in the reservoir 602. As the screw 546 rotates, the flange 584 carries oil up from the reservoir to a location above the lead screw, where the oil flows down a front face of the flange 584 through a gap 630 between the flange and the back end of the piston body 520 for delivering oil to the threads on the threaded shaft of the lead screw. Notches 634 are provided in the peripheral edge of the flange 584 to increase the amount of fluid carried by the flange. In this embodiment, two diametrically opposed, generally U-shaped notches 634 are provided, but the number and shape of the notches may vary. Other oil-delivery mechanisms can be used.

An oil-return mechanism is provided for allowing excess oil delivered to the mating threads 522, 566 on the piston body 520 and lead screw shaft 566 to return to the reservoir 602. In the illustrated embodiment, the oil-return mechanism comprises an axial groove 640 extending along the exterior of the threaded shaft 566 of the lead screw. Any excess oil on the shaft 566 moves along the groove 640 for delivery back to the reservoir 602 through the gap 630 between the front face of the lead screw flange 584 (at the front of the lead screw body 560) and the back end of the piston body 520. A passage 644 extending longitudinally through the follower body 606 allows lubricant in the reservoir 602 to flow past the follower 600 as the follower and piston move back and forth in the cavity.

Figure 9:
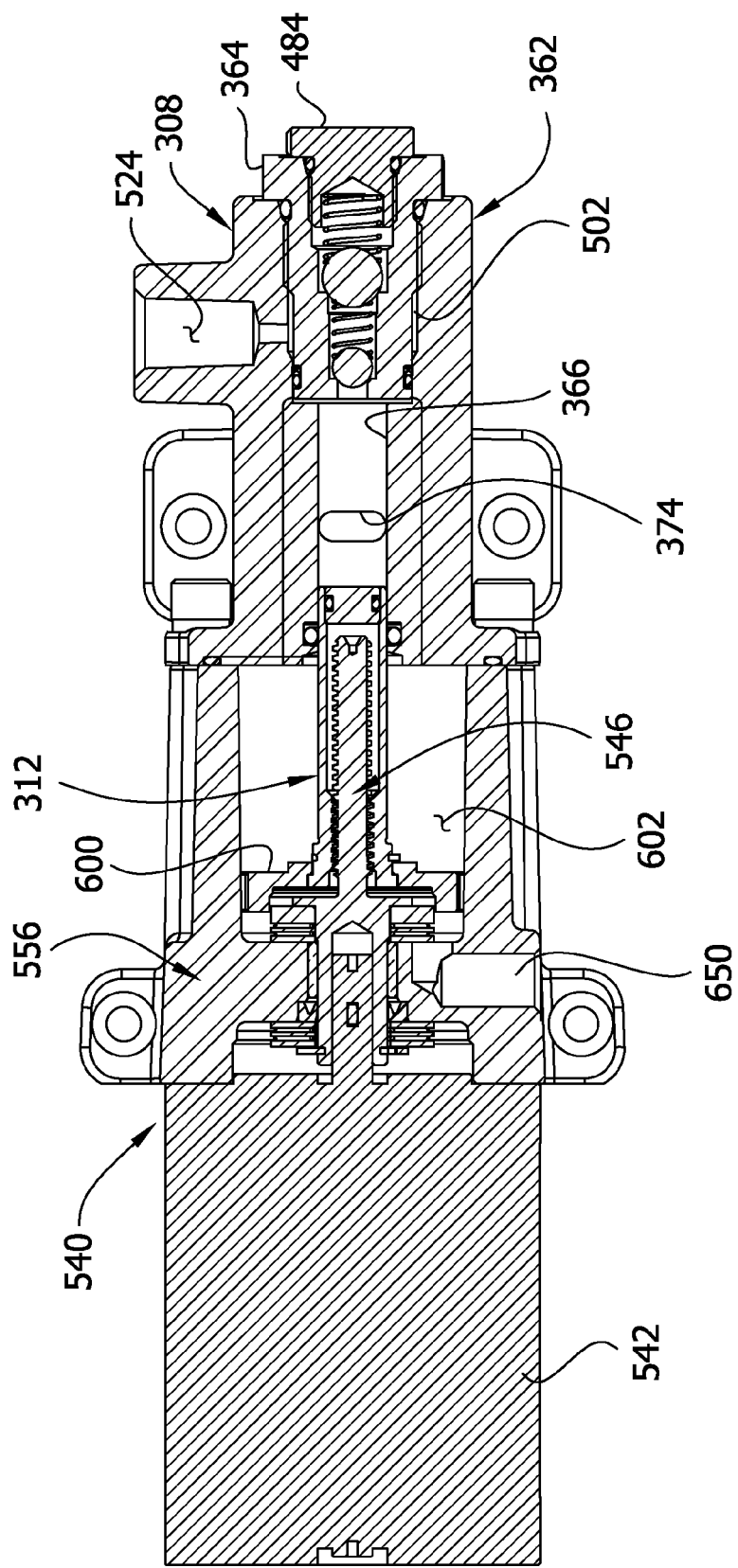
FIG. 9 is a view similar to FIG. 7 but rotated 90 degrees to illustrate an oblong portion of the cylinder inlet.

Referring to FIG. 9, the follower housing 556 has an inlet passage 650 allowing oil to flow from a suitable supply into the cavity. The inlet passage can also be used to drain oil from the cavity.

Figure 14:
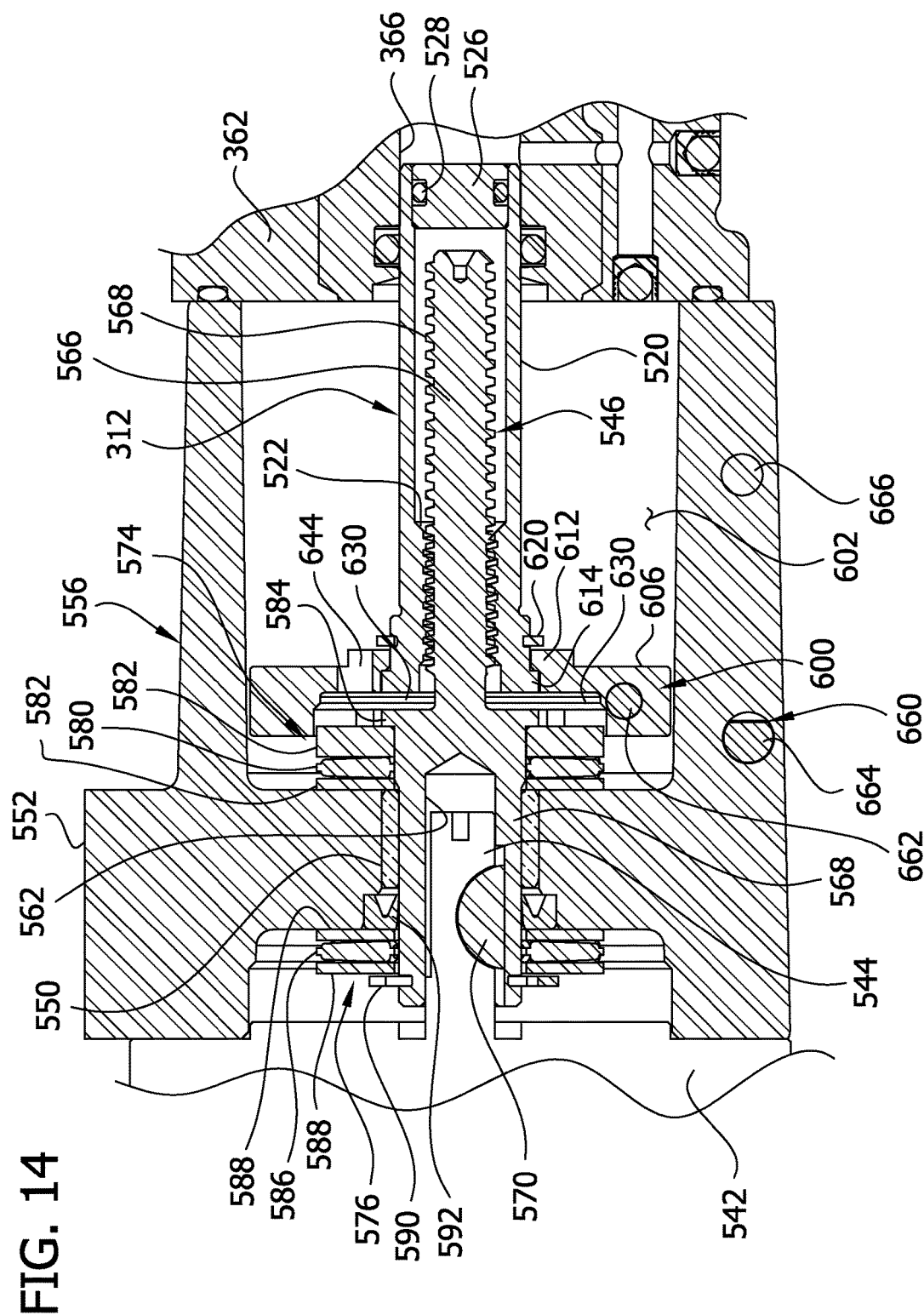
FIG. 14 is an enlarged vertical section showing components of the linear drive mechanism, including a drive screw, piston, follower housing, and follower.
Figure 15:
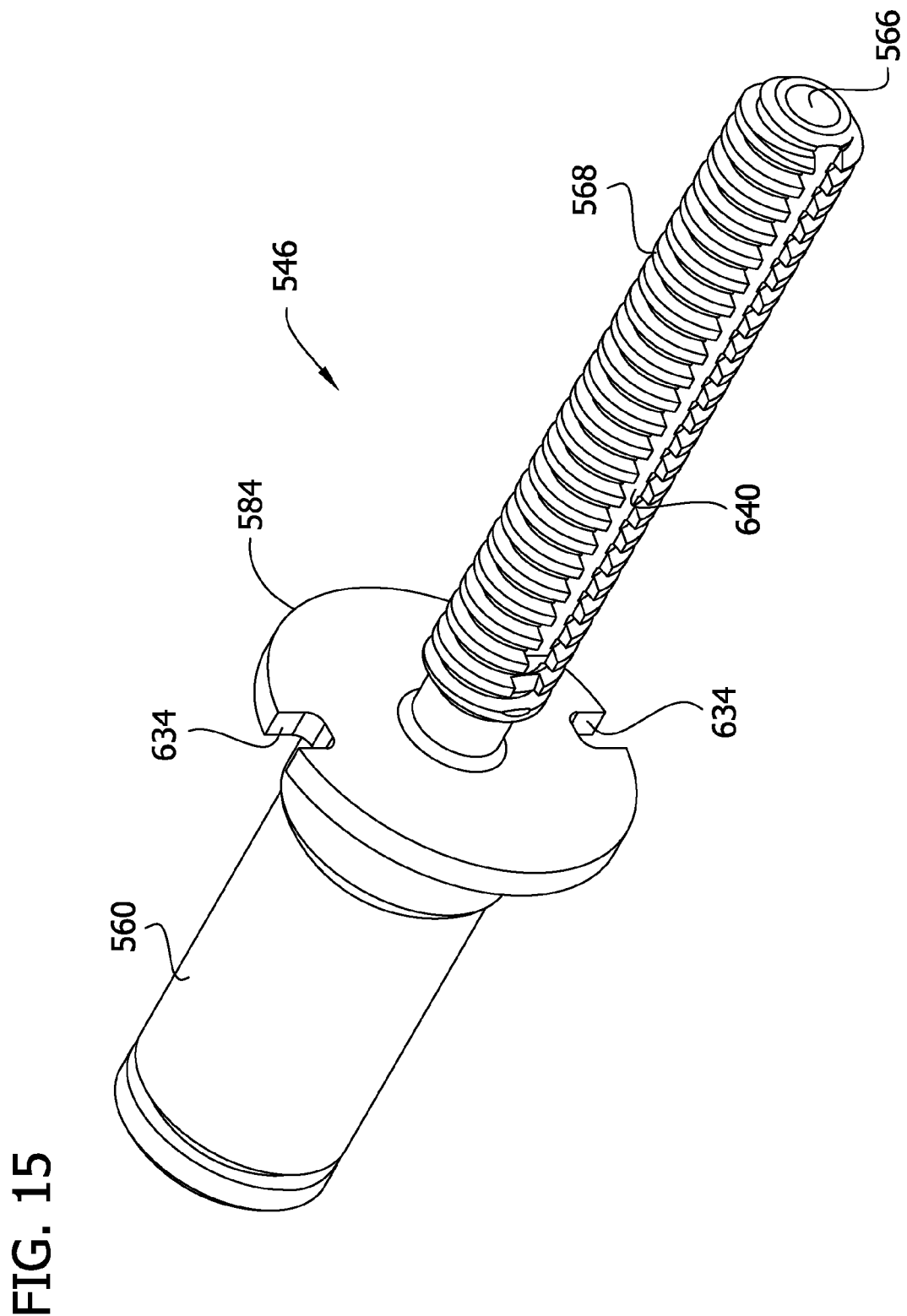
FIG. 15 is a perspective of the drive screw.

A calibration mechanism generally designated 660 in FIG. 14 is provided for calibrating operation of the stepper motor 542 relative to the position of the piston 310 in the cylinder bore 366. In the illustrated embodiment, this mechanism 660 comprises a magnet 662 on the follower 600 movable with the piston 310, and at least one and desirably two magnetic field sensors 664, 666 mounted on the follower housing 556 at spaced-apart locations with respect to the direction of piston movement. The controller of the pump unit 300 receives signals from the calibration mechanism 660 and calibrates operation of the linear position drive mechanism 540 relative to the position of the piston 310 in the cylinder 308. Other linear position drive mechanisms can be used to reciprocate the piston 310 in the cylinder bore 366.

The controller of the pump unit 300 includes the programmable microprocessor 572 that processes information. The controller calibrates and controls operation of the linear position drive mechanism 540 and is responsive to signals received from the pressure sensor 526 and the calibration mechanism 660 (e.g., magnetic field sensors 664, 666). The controller also controls operation of the stirrer motor 406 and the stepper motor 542. Desirably, the controller initiates operation of the stirrer motor 406 before the stepper motor 542 reciprocates the piston 310. This sequence allows the stirrer 400 to fluidize the lubricant and prime the pump cylinder 308 with lubricant before lubricant pumping begins, which can be especially advantageous if the lubricant is in a viscous condition, as in cold-temperature environments. After a suitable delay of predetermined length (e.g., eight to twelve seconds), the stepper motor 542 is energized to move the piston 310 through a succession of one or more pumping and return strokes to pump the desired amount of lubricant through the feed line 514, 516 connected to the distribution lube supply line.

When the pump unit 300 is operated in a non-venting mode, the piston 310 moves forward in the cylinder bore 366 through a pumping stroke to pump lubricant from the cylinder bore 366 and rearward through a non-venting return stroke during which the piston stops short of the location at which the vent passage 530 communicates with the cylinder bore 366. That is, the limit of the return stroke is downstream from the location at which the vent passage 530 communicates with the cylinder bore 366. As a result, the vent passage 530 does not communicate with the interior 336 of the tank 318, and there is no venting of the distribution system during a return stroke of the piston. As explained earlier, such venting is unnecessary in a progressive (divider) valve distribution application.

If the pump unit 300 is used with an injector distribution system requiring venting, the controller of the pump unit is programmed to operate the unit to pump the desired amount of lubricant through a lube supply line to a plurality of injectors at desired intervals of time. The injectors operate to deliver metered amounts of lubricant to respective points of lubrication (e.g., bearings). In this mode, the pump unit 300 operates as described above except that the piston 310 moves forward in the cylinder bore 366 through a pumping stroke to pump lubricant from the cylinder bore 366 and rearward through a venting return stroke during which the piston moves past the location at which the vent passage 530 communicates with the cylinder bore 366. That is, the limit of the return stroke is upstream from the location at which the vent passage 530 communicates with the cylinder bore 366. As a result, the vent passage 530 communicates with the interior of the tank (via the cylinder bore 366 and the defined flow path 386), and lubricant is vented to the tank to allow the injectors to reset for the next lube event.

Thus, the piston 310 of the pump unit 300 is movable through both venting and non-venting return strokes, depending on whether the distribution system being supplied with lubricant by the pump unit requires venting between lubrication events. In the embodiment described above, a venting return stroke of the piston 310 is somewhat longer than a non-venting return stoke of the piston.

The pump unit 300 is capable of pumping viscous lubricants at relatively low temperatures due at least in part to the strong push/pull forces exerted on the lubricant to force lubricant from the reservoir directly into the cylinder bore 366. As explained above, rotation of stirrer 400 causes the force-feed mechanism 430 to exert a strong downward force on lubricant in the interior 336 of the tank 318 tending to push it along the defined flow path 386 to the cylinder bore 366. Further, a return stroke of the piston generates a force tending to pull this same lubricant along the same defined flow path 386. The combination of these pushing and pulling forces is effective for moving viscous lubricant into the cylinder bore at lower temperatures.

Use of a stirrer and force feed mechanism of the type described above is not limited to the pump unit 300. The stirrer and force feed mechanism can be used in any type of pump unit in which lubricant is fed along a defined flow path from a reservoir to an inlet of a cylinder in which a piston reciprocates to deliver lubricant to a lubrication distribution system. The piston can be reciprocated by any type of linear or non-linear drive mechanism.

Further, the feature of moving a piston in a cylinder through forward pumping strokes and through rearward venting and non-venting return strokes of different lengths can be employed in lubricant pump units other than pump unit 300. The piston can be reciprocated through such strokes by any type of linear or non-linear drive mechanism to pump lubricant to vented (e.g., injector) lubricant distribution systems and to non-vented (e.g., divider valve) lubricant distribution systems.

Over time, the piston 310 may wear due to abrasive particles in the grease. As the piston 310 wears, a tight clearance between the piston 310 and cylinder bore 366 gradually opens, allowing grease to travel back past the piston during the pumping stroke, rather than being pushed past the first and second ball check valves 470, 478, respectively. When the piston 310 is worn sufficiently, the pump 300 can no longer achieve the required pressures and must be removed from service. A diagnostic test may be run to detect pump wear, estimate an amount of wear, and/or estimate wear rate so that maintenance personnel can predict when service or replacement will be required.

Figure 18:
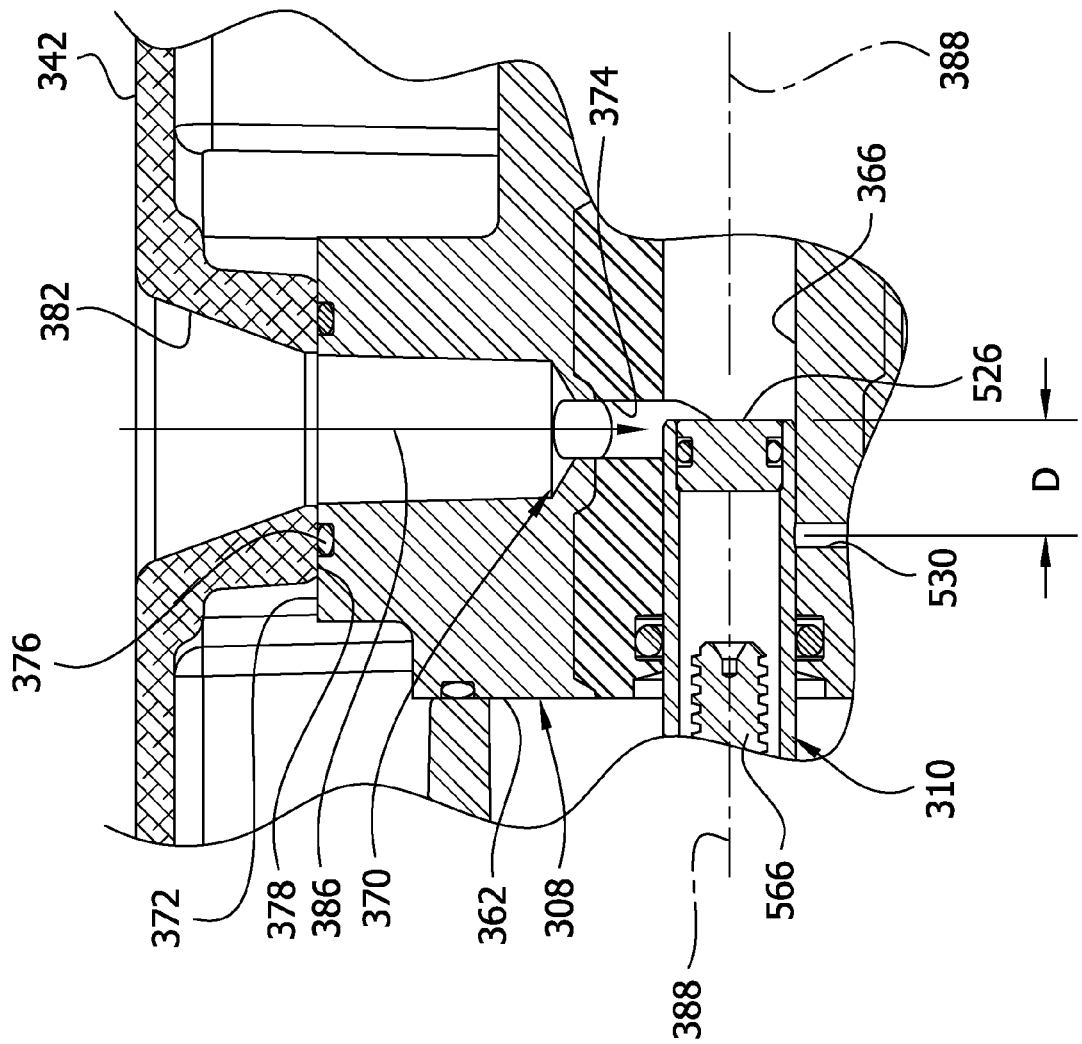
FIG. 18 is an enlarged section similar to FIG. 8 but showing the piston in a home position.

Although a method of diagnosing piston wear may be accomplished by an auxiliary analyzer or control unit that selectively connects to the pump controller, desirably the controller is programmed to conduct diagnostics at predetermined intervals or on demand. The controller operates the pump 300 until the pressure sensor 526 measures a predetermined pressure. In some embodiments, the predetermined pressure is about 3000 psi. Once the pump achieves the desired predetermined pressure, the controller stops the pump 300 with the piston 310 in a home position defined by the front or pressure face of the piston being a predetermined distance D (e.g., about 0.375 inch) in front of the vent passage 530 centerline as shown in FIG. 18. In this case, an opening where the vent passage 530 intersects the cylinder bore 366 forms a test port at which the pressure sensor 526 senses pressure. Because the piston tends to wear from its front face rearward, positioning the face a known distance in front of the vent passage 530 ensures an annular leakage pathway opens around a perimeter of the piston 310 as the piston wears. The predetermined distance may vary over time to adjust for piston wear occurring farther from the piston pressure face. The sensor 526 measures pressure at a preselected time interval after stopping the pump 300. In some embodiments, the preselected time interval when the sensor measures pressure is within a range between about 10 seconds and about 15 seconds after the pump stops, and more desirably about 15 seconds.

An amount of piston wear can be approximated based on a difference between the predetermined pressure at which the controller stops the pump 300 and the measured pressure at the predetermined time interval after the pumps stops. The piston wear may be approximated by empirical wear data for which wear is known over a range of pressure losses or drops. If the difference between the predetermined pressure and the measured pressure at the predetermined time interval (i.e., the pressure drop) exceeds a predetermined limit (e.g., about 200 psi), an alarm or signal can be activated to alert personnel the limit was exceeded and the pump should be removed from service for repair or replacement. Similarly, personnel can be notified if the difference between the predetermined pressure and the measured pressure at the predetermined time interval reaches a predetermined difference (e.g., 50 psi) indicating a small amount of wear has occurred.

As will be appreciated by those skilled in the art, by repeating the steps for diagnosing piston wear after a known time interval has passed, a wear rate can be calculated and future wear can be predicted based on the calculated historical rate(s) of wear. Predicting future wear may be accomplished assuming a linear wear rate, or in the case where multiple historical wear data are available, fitting a non-linear wear rate. As will also be appreciated by those skilled in the art, remaining piston service life can be approximated from the projected future wear rate and the approximated amount of piston wear. Alternatively, future piston wear predictions can be extrapolated from diagnosing piston wear after a known number of piston strokes. For example, if 2 microns of wear occurred after 3000 strokes, it would be predicted that 12 microns of wear would occur in six times the number of strokes (i.e., 18,000 strokes).

The microprocessor 572 may be programmed to perform the previously described diagnosis method after the pump accumulates a predetermined number of piston strokes (e.g., about 1000 strokes). Alternatively or in addition, the microprocessor 572 may be programmed to perform the previously described method after the pump 300 has operated for a predetermined cumulative service time interval (e.g., about 50 hours).

EXAMPLE

Several prototype pumps developed by Lincoln Industrial were tested over a period of time to verify that wear could be assessed by a measured pressure drop as discussed above. The pumps were operated until the sensor measured a pressure of about 3000 psi, after which the piston was moved to a home position about 0.375 inches in front of the vent passage centerline and held in that position for 15 seconds. The pressure drop measured by the sensor was recorded after 15 seconds and the piston diameter adjacent its forward pressure face was measured to determine how much wear had occurred. The initial radial clearance between the piston and cylinder was about 3 to about 5 microns. After the test was performed several times over a variety of conditions, approximate measured pressure drops for various amounts of radial wear were determined. Ranges of wear present for measured pressure drops are shown in Table 1.

TABLE 1

Correlation between Pressure Drop and Piston Radial Wear

| Approximate Measured Pressure Drop (psi) | Measured Radial Wear (microns) |
|---|---|
| 50 | 1 |
| 100 | 2-5 |
| 150 | 5-8 |
| 200 | 8-12 |

The previously described method of diagnosing piston wear is not sensitive enough when only a small amount of wear (e.g., less than 1 micron) has occurred. A more sensitive method is available. To perform this more sensitive method, the controller operates the pump 300 until the pressure sensor 526 measures the predetermined pressure as before. Once the pump achieves the desired predetermined pressure, the controller stops the pump 300 with the piston 310 in the home position as described before. The sensor 526 measures pressure at the preselected time interval after stopping the pump 300 as described in the prior method.

When the measured pressure drop is below a preselected pressure (e.g., about 50 psi), an indexed piston position is calculated. The indexed piston position is a position in which the piston is retracted a preselected indexing distance (e.g., about 0.125 inch) from the immediately preceding position (i.e., either the home position or a preceding indexing position). The pump is again driven to the predetermined pressure, but during this iteration the pump is stopped with the piston in the calculated indexed piston (e.g., 0.250 inch). The pressure at the test port is measured at the preselected time interval after stopping the pump as before. If the measured pressure drop is below the preselected pressure, a new indexed piston position is calculated (e.g., 0.125 inch) and the steps are repeated until the pressure drop reaches the preselected pressure. As before, an amount of piston wear can be approximated based on the distance between the indexed piston position and the home position, as well as a difference between the predetermined pressure at which the controller stops the pump 300 and the measured pressure at the predetermined time interval after the pump stops.

Other features and characteristics may be found in previously filed Patent Cooperation Treaty Application No. PCT/US2011/057592, which is incorporated herein by reference.

As will be appreciated by those skilled in the art, features of each of the previously described embodiments may be combined with features of other embodiments. These combinations are envisioned as being within the scope of the present invention.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The Abstract and Summary are provided to help the reader quickly ascertain the nature of the technical disclosure. They are submitted with the understanding that they will not be used to interpret or limit the scope or meaning of the claims.

The above description illustrates the invention by way of example and not by way of limitation. When two items or multiple items are illustrated, it is contemplated that the invention may include two or more items. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A method of diagnosing piston wear in an axial piston pump having a piston driven by a motor to reciprocate axially within a cylinder through a pumping stroke and a filling stroke and through a home position in which the piston overlaps a test port in the cylinder and a pressure face of the piston is positioned a predetermined distance from the test port, said method comprising the steps of:
   driving the pump to achieve a predetermined pressure;
   stopping the pump with the piston in its home position;
   measuring pressure at the test port at a preselected time interval after the step of stopping the pump; and
   approximating an amount of piston wear based on a difference between the predetermined pressure and the measured pressure at the predetermined time interval.

2. A method as set forth in claim 1, further comprising the step of alerting if the difference between the predetermined pressure and the measured pressure at the predetermined time interval exceeds a predetermined limit.

3. A method as set forth in claim 2, wherein the predetermined limit is 200 pounds per square inch.

4. A method as set forth in claim 1, further comprising the step of notifying if the difference between the predetermined pressure and the measured pressure at the predetermined time interval reaches a predetermined difference indicating wear has occurred.

5. A method as set forth in claim 4, wherein the predetermined difference is 50 pounds per square inch.

6. A method as set forth in claim 1, further comprising the steps of:
   repeating the driving, stopping, and measuring steps after a known period of pump usage; and
   determining an historical rate of wear based on the approximated amount of piston wear and the known period.

7. A method as set forth in claim 6, further comprising the step of projecting future wear based on the approximated amount of piston wear and the historical wear rate.

8. A method as set forth in claim 7, further comprising the step of approximating remaining piston service life based on the projecting future wear based on the approximated amount of piston wear and the historical wear rate.

9. A method as set forth in claim 1, wherein the predetermined distance is about 0.375 inch.

10. A method as set forth in claim 1, wherein the predetermined pressure is about 3000 pounds per square inch.

11. A method as set forth in claim 1, wherein the preselected time interval is between about 10 seconds and about 15 seconds.

12. A method as set forth in claim 11, wherein the preselected time interval is about 15 seconds.

13. A method as set forth in claim 1, wherein the method is performed after a predetermined number of piston strokes.

14. A method as set forth in claim 13, wherein the predetermined number of piston strokes is 1000 strokes.

15. A method as set forth in claim 1, wherein the method is performed after the pump has operated for a predetermined service time interval.

16. A method as set forth in claim 15, wherein the predetermined service time interval is about 50 hours.

* * * * *

UNITED STATES PATENT AND TRADEMARK OFFICE
CERTIFICATE OF CORRECTION

PATENT NO. : 9,671,065 B2  
APPLICATION NO. : 14/056394  
DATED : June 6, 2017  
INVENTOR(S) : Paul G. Conley and Nathan D. Donovan Page 1 of 1

It is certified that error appears in the above-identified patent and that said Letters Patent is hereby corrected as shown below:

In the Drawings

Sheet 6, FIG. 6, the reference number "500" and associated lead line should be deleted, and the reference number "508" should be replaced with reference number --526--.

Sheet 7, FIG. 7, the reference number "500" and associated lead line should be deleted, and the reference number "508" should be replaced with reference number --526--.

Sheet 8, FIG. 8, the reference number "526" and associated lead line should be deleted.

Sheet 14, FIG. 14, the reference number "526" and associated lead line should be deleted.

Sheet 18, FIG. 18, the reference number "526" and associated lead line should be deleted.

Signed and Sealed this  
Thirteenth Day of March, 2018

Andrei Iancu  
*Director of the United States Patent and Trademark Office*